US012215659B2

(12) United States Patent
Whittle

(10) Patent No.: US 12,215,659 B2
(45) Date of Patent: Feb. 4, 2025

(54) ELECTRONIC FUEL INJECTION THROTTLE BODY ASSEMBLY

(71) Applicant: Holley Performance Products, Inc., Bowling Green, KY (US)

(72) Inventor: Gregory Whittle, Bowling Green, KY (US)

(73) Assignee: Holley Performance Products, Inc., Bowling Green, KY (US)

( * ) Notice: Subject to any disclaimer, the term of this patent is extended or adjusted under 35 U.S.C. 154(b) by 80 days.

(21) Appl. No.: 17/980,843

(22) Filed: Nov. 4, 2022

(65) Prior Publication Data

US 2023/0051581 A1 Feb. 16, 2023

Related U.S. Application Data

(63) Continuation of application No. 16/404,308, filed on May 6, 2019, now Pat. No. 11,493,010.

(60) Provisional application No. 62/726,723, filed on Sep. 4, 2018, provisional application No. 62/669,052, filed on May 9, 2018.

(51) Int. Cl.

| | |
|---|---|
| ***F02M 69/04*** | (2006.01) |
| ***F02D 9/10*** | (2006.01) |
| ***F02D 11/10*** | (2006.01) |
| ***F02M 51/02*** | (2006.01) |

(52) U.S. Cl.

CPC ........... *F02M 69/04* (2013.01); *F02D 9/1035* (2013.01); *F02D 11/10* (2013.01); *F02M 51/02* (2013.01); *F02M 69/042* (2013.01); *F02D 2400/11* (2013.01)

(58) Field of Classification Search

CPC ...... F02M 69/04; F02M 51/02; F02M 69/042; F02D 9/1035; F02D 11/10; F02D 2400/11

See application file for complete search history.

(56) References Cited

U.S. PATENT DOCUMENTS

| | | | | |
|---|---|---|---|---|
| 2,989,044 A * | 6/1961 | Humber | F02M 69/34 123/446 |
| 4,224,908 A | 9/1980 | Bier et al. | |
| 4,230,645 A | 10/1980 | Dodson | |
| 4,246,875 A | 1/1981 | Bier et al. | |
| 4,294,282 A | 10/1981 | McCabe et al. | |

(Continued)

FOREIGN PATENT DOCUMENTS

| | | |
|---|---|---|
| AU | 339157 | 10/2011 |
| AU | 341133 | 2/2012 |

(Continued)

OTHER PUBLICATIONS

U.S. Appl. No. 29/628,392 entitled "EFI Throttle Body" filed Dec. 4, 2017.

(Continued)

*Primary Examiner* — Phutthiwat Wongwian
*Assistant Examiner* — Susan E Scharpf
(74) *Attorney, Agent, or Firm* — Dinsmore & Shohl LLP

(57) ABSTRACT

Present embodiments related to throttle body fuel injection systems intended to replace existing carburetors. More specifically, present embodiments relate to retrofitting carbureted engines with electronic fuel injection (EFI) which may be mounted on a manifold of an internal combustion engine and have bores of differing sizes and other characteristics which allow operation of such arrangement.

17 Claims, 17 Drawing Sheets

(56) References Cited

U.S. PATENT DOCUMENTS

| | | | | |
|---|---|---|---|---|
| 4,306,441 | A | 12/1981 | Dodson | |
| 4,318,214 | A | 3/1982 | Dodson | |
| 4,325,339 | A | 4/1982 | Bier et al. | |
| 4,325,341 | A * | 4/1982 | Yamauchi | F02M 71/00 123/549 |
| 4,357,283 | A | 11/1982 | Manning | |
| 4,434,762 | A | 3/1984 | McCabe | |
| 4,434,763 | A | 3/1984 | McCabe et al. | |
| 4,510,909 | A | 4/1985 | Elphick | |
| 4,556,032 | A | 12/1985 | Miller | |
| 4,949,983 | A | 8/1990 | Miller | |
| 5,261,382 | A | 11/1993 | Nikolai | |
| 5,778,857 | A * | 7/1998 | Nakamura | F02D 37/02 123/406.41 |
| 5,863,470 | A * | 1/1999 | Grant | F02M 9/14 261/DIG. 12 |
| D447,147 | S | 8/2001 | Grant | |
| 6,481,698 | B1 | 11/2002 | Calvin et al. | |
| D508,496 | S | 8/2005 | Grant | |
| D543,555 | S | 5/2007 | Braswell et al. | |
| D555,668 | S | 11/2007 | Benoit | |
| D578,550 | S | 10/2008 | Benoit | |
| 7,533,661 | B2 | 5/2009 | Baasch | |
| 7,591,245 | B2 | 9/2009 | Baasch et al. | |
| 7,735,475 | B2 | 6/2010 | Farrell | |
| D645,058 | S | 9/2011 | Benoit | |
| D648,746 | S | 11/2011 | Tipton et al. | |
| D655,311 | S | 3/2012 | Gieske et al. | |
| D659,714 | S | 5/2012 | Gieske et al. | |
| D721,389 | S | 1/2015 | Gieske et al. | |
| 9,115,671 | B2 * | 8/2015 | Benoit | F02M 19/08 |
| 9,303,578 | B2 | 4/2016 | Wittkopf et al. | |
| 9,376,997 | B1 | 6/2016 | Farrell et al. | |
| D760,804 | S | 7/2016 | Shehan et al. | |
| 9,482,198 | B1 | 11/2016 | Farrell et al. | |
| 9,845,740 | B2 | 12/2017 | Wittkopf et al. | |
| D808,435 | S | 1/2018 | Shehan et al. | |
| D810,142 | S | 2/2018 | Shehan et al. | |
| 10,012,197 | B2 | 7/2018 | Flynn et al. | |
| D826,280 | S | 8/2018 | Koo et al. | |
| 10,094,353 | B2 | 10/2018 | Bennett et al. | |
| 10,662,916 | B2 * | 5/2020 | Laws | F02M 61/145 |
| 11,493,010 | B2 * | 11/2022 | Whittle | F02M 69/04 |
| 2008/0230034 | A1 | 9/2008 | Dunn | |
| 2009/0013955 | A1 | 1/2009 | Sheridan et al. | |
| 2009/0088950 | A1 * | 4/2009 | Fisher | F02M 21/047 261/78.1 |
| 2009/0107459 | A1 * | 4/2009 | Ross, Jr. | F02M 55/02 123/468 |
| 2009/0145406 | A1 * | 6/2009 | Farrell | F02M 69/044 123/470 |
| 2013/0054121 | A1 | 2/2013 | Casoni et al. | |
| 2013/0298871 | A1 * | 11/2013 | Bennett | F02M 29/04 123/445 |
| 2015/0108256 | A1 * | 4/2015 | Flynn | F02M 35/1216 239/562 |
| 2017/0198672 | A1 * | 7/2017 | Farrell | F02M 51/005 |
| 2018/0119656 | A1 * | 5/2018 | Shehan | F02D 9/02 |
| 2019/0345905 | A1 * | 11/2019 | Whittle | F02M 69/042 |

FOREIGN PATENT DOCUMENTS

| | | |
|---|---|---|
| AU | 348732 | 5/2013 |
| AU | 348733 | 5/2013 |
| AU | 348734 | 5/2013 |
| AU | 356762 | 8/2014 |
| AU | 201710470 | 2/2017 |
| AU | 201710471 | 2/2017 |
| AU | 2013254906 | 11/2017 |
| AU | 201813353 | 8/2018 |
| AU | 201813355 | 8/2018 |
| AU | 201815034 | 9/2018 |
| AU | 201815036 | 9/2018 |
| AU | 201816623 | 12/2018 |
| AU | 201816624 | 12/2018 |
| CN | 101568711 | 4/2013 |
| EP | 003729599 | 1/2017 |
| WO | 2019217311 | 11/2019 |

OTHER PUBLICATIONS

Holley Performance Products, Inc., 2017 New & Hot Products Catalogue—Carburetors, Nov. 1, 2016.

U.S. Appl. No. 62/594,526 entitled "Electronic Fuel Injection Throttle Body Assembly" filed Dec. 4, 2017.

Australian Patent Application No. 2017251869 entitled "Electronic Fuel Injection Throttle Body Assembly" filed Oct. 30, 2017.

U.S. Appl. No. 62/594,527 entitled "Electronic Fuel Injection Throttle Body Assembly" filed Dec. 4, 2017.

U.S. Appl. No. 29/628,394 entitled "EFI Throttle Body" filed Dec. 4, 2017.

U.S. Appl. No. 62/669,052 entitled "Electronic Fuel Injection Throttle Body Assembly" filed May 9, 2018.

U.S. Appl. No. 15/986,571 entitled "Fuel Injection Throttle Body " filed May 22, 2018.

U.S. Appl. No. 16/208,246 entitled "Electronic Fuel Injection Throttle Body Assembly" filed Dec. 3, 2018.

U.S. Appl. No. 29/647,060 entitled "Electronic Fuel Injection Throttle Body" filed May 9, 2018

U.S. Appl. No. 62/669,094 entitled "Electronic Fuel Injection Throttle Body Assembly" filed May 9, 2018.

U.S. Appl. No. 62/726,723 entitled "Electronic Fuel Injection Throttle Body Assembly" filed Sep. 4, 2018.

Mopar Performance P5249686 Jeep MPI-Fuel, Sep. 2, 2016.

Howell EFI Fuel Injection Conversion Kit, JP258, Apr. 29, 2015.

F.A.S.T. EZ-EFI Self-Tuning Fuel Injection Systems 30294-Kit TBI Converstion Kit, Jun. 30, 2015.

U.S. Appl. No. 16/208,231 entitled "Electronic Fuel Injection Throttle Body Assembly" filed Dec. 3, 2018.

International Search Report and Written Opinion for PCT/US2018/063660 dated Mar. 20, 2019.

International Search Report and Written Opinion for PCT/US2018/063668 dated Mar. 20, 2019.

Canadian Design Patent Application No. 184483 entitled "Electronic Fuel Injection Throttle Body" filed Oct. 31, 2018.

Canadian Design Patent Application No. 184482 entitled "Electronic Fuel Injection Throttle Body" filed Oct. 31, 2018.

Mexican Design Patent Application No. MX/f/2018/003332 entitled "Electronic Fuel Injection Throttle Body" filed Nov. 8, 2018.

Mexican Design Patent Application No. MX/f/2018/003333 entitled "Electronic Fuel Injection Throttle Body" filed Nov. 8, 2018.

U.S. Appl. No. 29/647,068 entitled "Electronic Fuel Injection Throttle Body" filed May 9, 2018.

Wikipedia, Quadrajet, Rochester Products spread bore carburetor introduced in 1964, retrieved from internet on Apr. 16, 2019.

The International Bureau of WIPO; International Preliminary Report on Patentability for application No. PCT/US2019/030909 dated Nov. 10, 2020.

Youtube video, "Holley Terminator EFI Kit Electronic Fuel Injection", May 6, 2015, retrieved on Jul. 1, 2019. Retrieved from https://www.youtube.com/watch?v=hrTppUkNAn0.

U.S. Appl. No. 16/405,519 entitled "Electronic Fuel Injection Throttle Body Assembly" filed May 7, 2019.

U.S. Appl. No. 29/688,819 entitled "Electronic Fuel Injection Throttle Body" filed Apr. 24, 2019.

U.S. Appl. No. 29/693,670 entitled "EFI Throttle Body" filed Jun. 4, 2019.

U.S. Appl. No. 29/695,154 entitled "EFI Throttle Body" filed Jun. 17, 2019

U.S. Appl. No. 29/696,092 entitled "Electronic Fuel Injection Throttle Body" filed Jun. 25, 2019.

International Search Report and Written Opinion for PCT/US2019/031138 dated Aug. 27, 2019.

International Search Report and Written Opinion for PCT/US2019/030909 dated Aug. 20, 2019.

(56) References Cited

OTHER PUBLICATIONS

Australian Patent Application No. 2019267442 titled "Electronic Fuel Injection Throttle Body Assembly" entered national stage Nov. 5, 2020.
Ruggles, Cliff, "How to Rebuild and Modify Rochester Quardrajet Carburetors", 2006, CarTech, pp. 6-7 (Year: 2006).

* cited by examiner

ELECTRONIC FUEL INJECTION THROTTLE BODY ASSEMBLY

CLAIM TO PRIORITY

This continuation patent application claims priority to and benefit of, under 35 U.S.C. § 120, to U.S. patent application Ser. No. 16/404,308, filed May 6, 2019 which claims priority to both U.S. Provisional Patent Application Ser. No. 62/669,052, filed May 9, 2018, titled “Electronic Fuel Injection Throttle Body Assembly”, and U.S. Provisional Patent Application Ser. No. 62/726,723, filed Sep. 4, 2018, titled “Electronic Fuel Injection Throttle Body Assembly”, all of which is incorporated by reference herein.

BACKGROUND

Field of the Invention

Present embodiments relate to an electronic fuel injection throttle body assembly intended to replace existing carburetors. More specifically, present embodiments relate to retrofitting carbureted engines with electronic fuel injection (EFI) which has bores of differing sizes and other characteristics which allow operation of such arrangement.

Description of the Related Art

Prior art carburetors are often fully mechanical or hydraulic which over time can lead to decrease in proper function. Further, variations in atmospheric temperature and pressure, engine temperature, load and speed are all variable rendering difficult to maximize efficiency and/or performance of prior art carburation. For example, cold engine condition, an engine at idle, and an engine at wide-open throttle all require a rich fuel-air mixture. However, warm engine at cruise requires a lean fuel-air mixture. The airflow also varies greatly, as much as 100 times, between wide-open throttle and idle condition. Still another variable may be fuel formulations and characteristics.

Replacement throttle body systems may be utilized to provide carburetor replacement. However it would be desirable to provide the improved performance of electronic fuel injection. This is especially true for higher performance engines or improving performance and consistency of older engines.

However, when installing these systems, there are multiple variables related to size of throttle body, space on the engine and relative to the vehicle hood, space relative to surrounding engine components.

It would be desirable to improve consistency of operation of an engine throttle body to improve carburetion while also improving performance and/or efficiency. It may also be desirable to provide a throttle body which may be used as a replacement for a carburetor but which is adapted to function with electronic fuel injection. It may also be desirable in some instances for the engine throttle body to aesthetically resemble the carburetor it is replacing, for example with the fittings in similar locations and the like.

The information included in this Background section of the specification, including any references cited herein and any description or discussion thereof, is included for technical reference purposes only and is not to be regarded subject matter by which the scope of the invention is to be bound.

SUMMARY

The present application discloses one or more of the features recited in the appended claims and/or the following features which alone or in any combination, may comprise patentable subject matter.

Embodiments relate to carburetor retrofit fuel injection systems. Present embodiments provide an Electronic Fuel Injection Throttle Body Assembly which has bores of differing sizes so that the engine can be operated in a more efficient manner but which also has capacity to operate in a high performance mode wherein all of the bores may provide fuel. The fuel injection system also provides for a throttle arrangement to provide this functionality. Still further, plumbing is provided for the throttle body assembly to also provide this functionality.

According to some embodiments, an electronic fuel injection throttle body assembly comprises a throttle body having an upper inlet and a lower outlet and may be configured to mount to an internal combustion engine. At least two bores may extend through the throttle body. A first fuel injector may be disposed at least partially within the throttle body at a first position corresponding to a first bore of the at least two bores. A second fuel injector may be disposed at least partially within the throttle body at a second position, the second position may correspond to a second bore of the at least two bores. The first fuel injector and the second fuel injector may be configured to direct fuel into a channel defined at least partially by at least one fuel distribution ring. The at least one fuel distribution ring may have a plurality of fuel apertures directing fuel into a bore of the throttle body. One of the first and second bores being of a first size and the other of the first and second bores may be of a second size, wherein one of the first and second pairs of bores is larger than the other. A throttle valve may be disposed within the bores. A throttle lever assembly may be disposed on a side of the throttle body, a shaft may be extending from the throttle lever assembly toward the bore to control a position of the throttle valve. An electronic control unit may control operation of the fuel injectors.

According to some optional embodiment, the following may be utilized with the preceding embodiments individually or in combinations. The at least two bores may comprise four bores and further wherein two of the four bores are of a first larger size and two of the four bores are of a smaller size. The larger bore and the smaller bore may be aligned in a direction between the inlet fuel component cover and said outlet fuel component cover. The smaller bore may be delivered fuel by injectors on one side of the throttle body and the larger bore may be delivered fuel by injectors on the other side of the throttle body. The smaller bores may be delivered fuel by injectors of an inlet fuel component cover. The larger bores are delivered fuel by injectors of an outlet fuel component cover. One of a first or second pair of fuel injectors delivers fuel to one of each of the larger bores and smaller bores. The other of the first or second pair of fuel injectors delivers fuel to the other of each of the larger bores and smaller bores. The electronic fuel injection throttle body assembly may further comprise a throttle link which opens throttle valves of the smaller bores at a different rate than throttle valves of the larger bores. The smaller bores may define a primary bore and the larger bores define a secondary bore. The control unit may be mounted to the throttle body. A fuel flow of the throttle body assembly may be returnless. The fuel flow of said throttle body may be reversible.

According to some embodiments, an electronic fuel injection throttle body assembly, comprises a throttle body having an upper inlet and a lower outlet configured to mount to an internal combustion engine. A plurality of bores may extend through the throttle body, wherein the bores each have the upper inlet and the lower outlet. An inlet fuel component cover and an outlet fuel component cover disposed on opposite sides of the throttle body. A fuel crossover tube which extends from the inlet fuel component cover to the outlet fuel component cover. The fuel crossover tube may have at least one stop bead at each end of the crossover tube, the at least one stop bead disposed in each of the inlet fuel component cover and the outlet fuel component cover. The fuel crossover tube may be captured between the inlet and outlet fuel component covers when the fuel component covers are connected to the throttle body. An electronic control unit may be disposed on the throttle body.

According to some optional embodiments, the following may be utilized with the preceding embodiments individually or in combinations. The fuel crossover tube may be external to the throttle body. The fuel crossover tube is captured between the fuel component covers.

According to some embodiments, an electronic fuel injection throttle body assembly comprises a throttle body having an upper inlet and a lower outlet configured to mount to an internal combustion engine. At least two bores extending through the throttle body. A first fuel injector disposed at least partially within the throttle body at a first position corresponding to a first bore of the at least two bores. A second fuel injector disposed at least partially within the throttle body at a second position, the second position corresponding to a second bore of the at least two bores. One of the first and second bores being of a first size and the other of the first and second bores being of a second size, wherein one of the first and second pair of holes is larger than the other. A throttle valve disposed within each of said bores. A throttle lever assembly disposed on a side of the throttle body, a shaft extending from the throttle lever assembly toward the bore to control a position of the throttle valve. The throttle lever assembly may be modular to accept parts and provide various throttle connections and positions for differing. An electronic control unit disposed on the throttle body.

According to some optional embodiments, the following may be utilized with the preceding embodiments individually or in combinations. The first fuel injector and the second fuel injector may direct fuel into a channel of at least one fuel distribution ring, the at least one fuel distribution ring having a plurality of fuel apertures directing fuel into a bore of the throttle body.

According to some embodiments, an electronic fuel injection throttle body comprises a throttle body having an upper inlet and a lower outlet and configured to mount to an internal combustion engine. At least two bores may extend through the throttle body. A first fuel injector disposed at least partially within the throttle body at a first position corresponding to a first bore of the at least two bores and a second fuel injector disposed at least partially within the throttle body at a second position, the second position corresponding to a second bore of the at least two bores. The first fuel injector and the second fuel injector configured to direct fuel into a channel at least partially defined by at least one fuel distribution ring, the at least one fuel distribution ring having a plurality of fuel apertures directing fuel into a bore of the throttle body. One of the first and second bores being of a first size and the other of the first and second bores being of a second size, wherein one of the first and second pair of bores is larger than the other. A throttle valve may be disposed within each the bores. A throttle lever assembly disposed on a side of the throttle body. A shaft may extend from the throttle lever assembly toward the bore to control a position of the throttle valve. An electronic control unit may controls operation of the fuel injectors. The throttle lever assembly may open the throttle valve of the first smaller bore at a different rate than the throttle valve of the second larger bore.

According to some embodiments, an electronic fuel injection throttle body, comprises a throttle body having an upper inlet and a lower outlet, at least two bores extending through the throttle body, one of the first and second bores being of a first size and the other of the first and second bores being of a second size, wherein one of the first and second pair of bores is larger than the other, an insert with varying wall thickness from top to bottom, which is capable of being disposed in the larger of the two bores to increase airflow speed from the inlet toward the outlet, a throttle valve disposed in each of the bores and a throttle lever assembly having a throttle shaft engaging the throttle valves, an electronic control unit which controls operation of fuel injectors disposed in said throttle body.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. All of the above outlined features are to be understood as illustrative only and many more features and objectives of an electronic fuel injection throttle body or assembly may be gleaned from the disclosure herein. Therefore, no limiting interpretation of this summary is to be understood without further reading of the entire specification, claims and drawings, included herewith.

BRIEF DESCRIPTION OF THE DRAWINGS

In order that the embodiments may be better understood, embodiments of the electronic fuel injection throttle body system will now be described by way of examples. These embodiments are not to limit the scope of the claims as other embodiments of the electronic fuel injection throttle body system or assembly will become apparent to one having ordinary skill in the art upon reading the instant description. Non-limiting examples of the present embodiments are shown in figures wherein:

DETAILED DESCRIPTION

Figure 1:
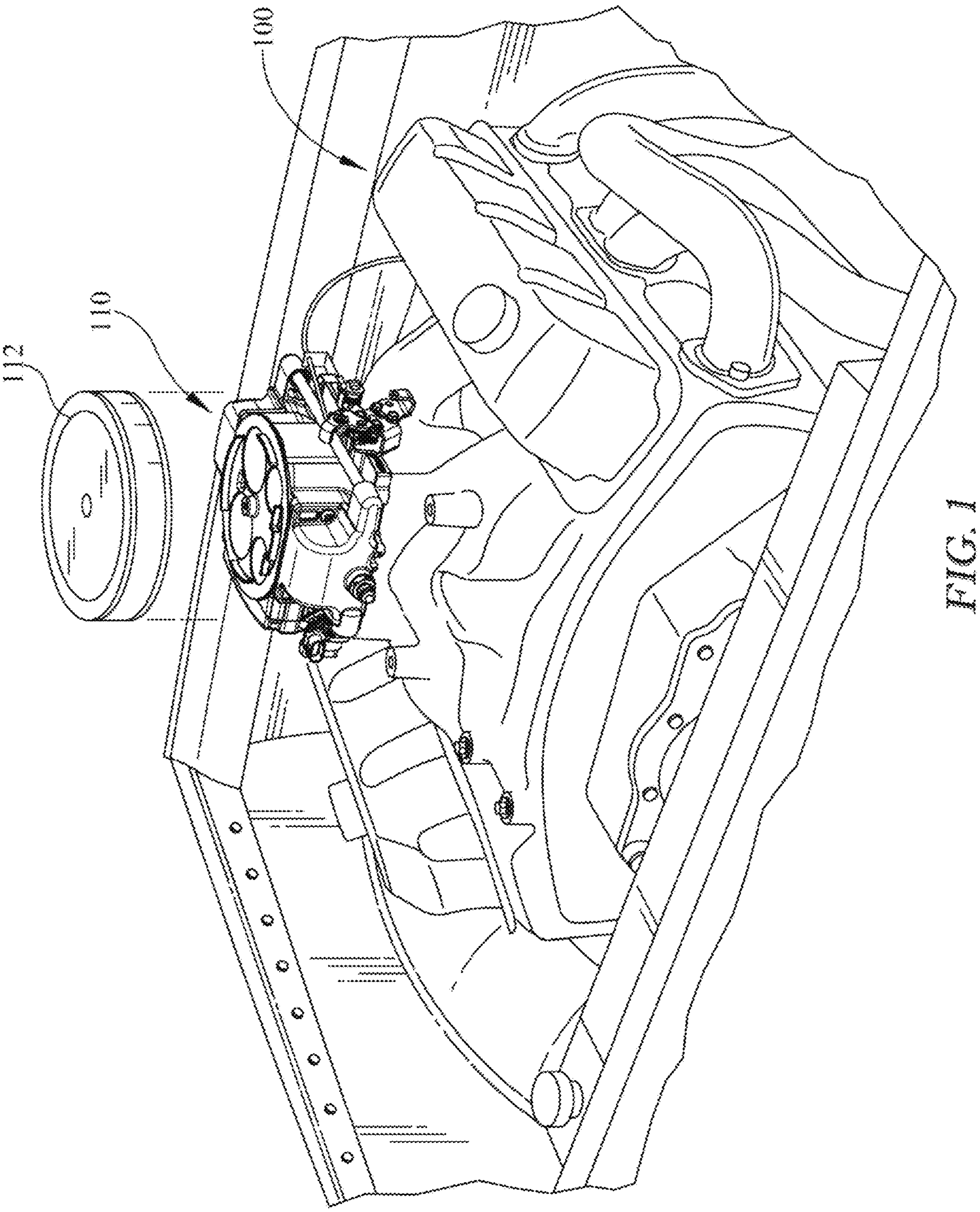
FIG. 1 is a perspective view of an illustrative non-limiting combustion engine and an electronic fuel injection throttle body assembly.

It is to be understood that the electronic fuel injection throttle body assembly is not limited in its application to the details of construction and the arrangement of components set forth in the following description or illustrated in the drawings. The throttle body assembly is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Referring now in detail to the drawings, wherein like numerals indicate like elements throughout several views, there are shown in FIGS. 1-17 various embodiments of an electronic fuel injection throttle body fuel assembly are depicted. Present embodiments pertain to an electronic fuel injection throttle body assembly which may be used to replace older carburetor assemblies and provide improved function of electronic fuel injectors. The present electronic fuel injection throttle body assembly may have multiple bores of differing sizes and allow in some operating modes a more efficient operation with less fuel use and in other configuration a higher performance operation with higher fuel use.

With reference to FIG. 1, a partial perspective view of an engine compartment is depicted wherein a combustion engine 100 is provided with an electronic fuel injection (EFI) throttle body assembly 110 and an air filter 112. The engine is illustrative as one or more throttle body assemblies 110 may be utilized and one or more filter configurations may be used to deliver air to the one or more throttle body assemblies 110. Moreover, although the throttle body assembly 110 is depicted in an orientation, this is not limiting as other orientations may be utilized and may be dependent upon the engine type and configuration of fuel lines and throttle linkage. The combustion process, as one of skill in the art will know, combines fuel and air with an ignition source. The instant throttle body assembly 110 is mounted to the engine 100 directly, such as at the engine manifold, and receives air through the air filter 112. The assembly 110 also receives fuel from a fuel tank and mixes the two for the ignition which occurs in the engine 100. In other embodiments, the assembly 110 may be mounted to the engine indirectly such as to a supercharger.

The EFI throttle body assembly 110 is configured to be compact allowing use in a variety of configurations. Due to the wide variety of engine manufactures and vehicle types and sizes, it is desirable to provide a structure which may be used in many of these vehicles/engines. This also requires consideration of space relative to the engine hood and space relative to surrounding engine components. It may also be desirable to provide a device of minimal height, for example less than about 5 inches, a forward to rear length of about 13 inches and a side to side length of about 9 inches. These dimensions are merely illustrative of a non-limiting embodiment, but provide a compact design desirable for use across many engine sizes and vehicle types. Still further, it may be desirable to provide a size which approximates a carburetor which may be in process of being replaced.

Figure 2:
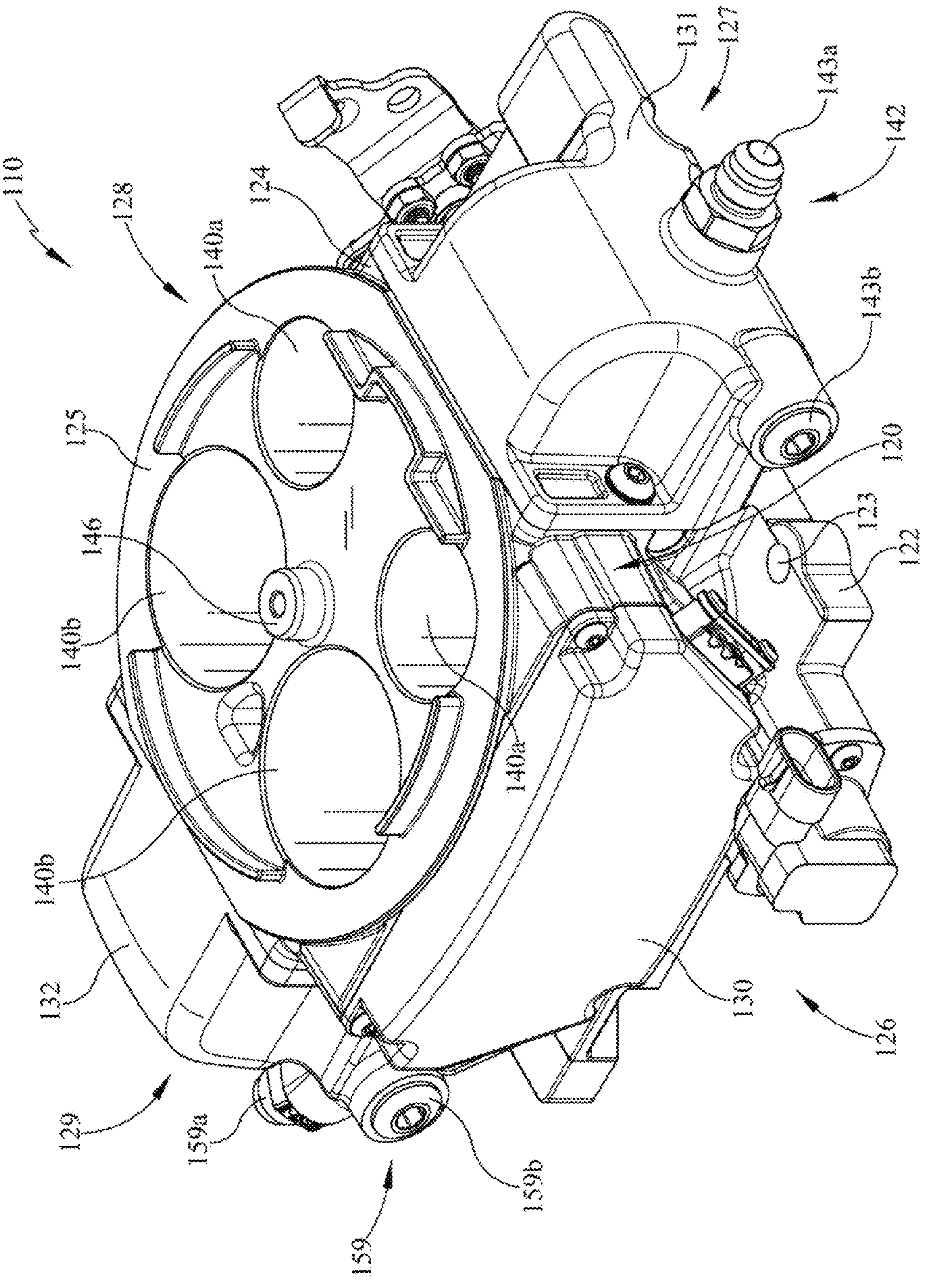
FIG. 2 is an upper perspective view of the electronic fuel injection throttle body assembly of FIG. 1 removed from the engine.

With reference to FIG. 2, a first upper perspective view of the electronic fuel injection throttle body assembly 110 is depicted. The throttle body assembly 110 includes a throttle body 120 having a mounting base 122 and a main body 124 which extends upwardly from the base 122. A stand 146 is provided between the bores 140 which supports a fastener (not shown) extending through the throttle body 120 or oppositely may extend downwardly through the air filter to engage the stand 146. In some examples, the stand 146 may be defined by a threaded boss, however, this is merely one example and other structures may be used alternatively. The fastener may extend upwardly for engagement and connection of the air filter 112 (FIG. 1). The upper end of the main body 124 may include an upper flange 125. This may define a seat or upper limit for positioning of air intake structure, such as filter 112 for example, above the throttle body assembly 110. The base 122 may have a plurality of holes 123 for mounting the assembly 110 wherein the multiple holes 123 provide various known bolt patterns for connection of the assembly 110 to an engine manifold. For example, in some embodiments, four bolts or screws may be used to mount the base; however, this is not intended to be limiting as any number of bolt patterns may be used.

The depicted embodiment shows a four barrel throttle body assembly. These barrels are also commonly referred to as bores 140 throughout this description—the terms may be considered interchangeable. Additionally, more than one throttle body assembly 110 may be used in the engine 100 (FIG. 1) depending on the engine type and configuration of intakes. This may be necessary for high horsepower arrangements where higher amounts of fuel and air are required.

The front of the throttle body assembly 110 is shown in the instant view. For purpose of directional reference, but not limiting, a front side 126 of the throttle body assembly 110 is shown and a rear side 128, as shown more clearly in FIG. 3. Side 126 of the throttle body assembly 110 may include an electronic control unit (ECU) cover 130. As will be described in further detail herein, the cover 130 conceals and contains an electronic control unit 190 (FIG. 7), which may be mounted to the throttle body 120 or within the cover 130, or a combination thereof. This cover 130 may be bolted to the throttle body 120 or otherwise fastened thereto.

The throttle body assembly 110 also comprises a first side 127 and second side 129, which are labeled for ease of reference in description. Again the term "side" is merely descriptive as all of the surroundings of the assembly 110 may be considered sides or ends. The throttle body sides 127, 129 include fuel components which also function as covers 131, 132. The fuel component covers 131, 132 are mounted on opposite sides of the throttle body 120. Further for example, the illustrative embodiment includes the component covers 131, 132 on the first and second sides. The fuel component covers 131, 132 provide a cover for a fuel pathway and define the fuel passageway therein, which will be described in greater detail herein. The fuel component covers 131, 132 are fastened to the throttle body 120 and the ECU cover 130 is mounted and fastened to the front of the body 120 therebetween. Again, the sides may differ in mounting position in other embodiments as the descriptions are not limiting. Throughout the specification, the fuel component covers 131, 132 may additionally be referred to as inlet or outlet covers. This inlet or outlet description is merely illustrative of one embodiment but one skilled in the art should realize that the fuel flow direction may be reversed in some other embodiments and therefore, the terms "inlet" and "outlet" should not be considered limiting.

In addition to the fuel passageway in the component covers 131, 132, these structures also cover fuel injectors $\mathbf{1170}_x$ (FIGS. 4-9) and mounted therein and extending into the throttle body 120. With the electronic control unit cover 130 positioned on the side 126, for purpose of description only the front side, of the throttle body assembly 110 adjacent to the component covers 131, 132, the wire extending between the electronic control unit 190 (FIG. 7) and each of the fuel injectors $\mathbf{1170}_{1\text{-}4}$ may remain substantially unexposed.

The fuel component covers 131, 132 are also shown in FIG. 2. The fuel component cover 131 may comprise one or more inlet fittings 143*a*, 143*b* which may define one or more fuel inlets 142. In some embodiments, fittings 143*a*, 143*b* may be a standard fitting such as an SAE or similar automotive fitting for ease of use and/or replacement. In some embodiments, one of the fittings 143*a*, 143*b* may be closed or plugged while the other of the fittings is open to flow communication. The inlets 143*a*, 143*b* allow for an alternate fuel inlet location, which may be desirable depending on the engine configuration and fuel line location. For example, the fuel supply line may be split with a Y or T and directed into the inlets 143*a*, 143*b*. In still further embodiments, an outlet 159, may alternatively be used as an inlet in a reversed flow direction wherein fittings 159*a*, 159*b* may provide an inlet location if fuel flows in an opposite direction through the assembly 110. In such manner, the fittings 143*a*, 143*b*, may be plugged in a returnless style of operation. In still further alternatives, such as use with a wet nitrous system for example, fuel may be supplied by one of the inlets if desirable to a nitrous solenoid in order to provide for use.

Figure 4:
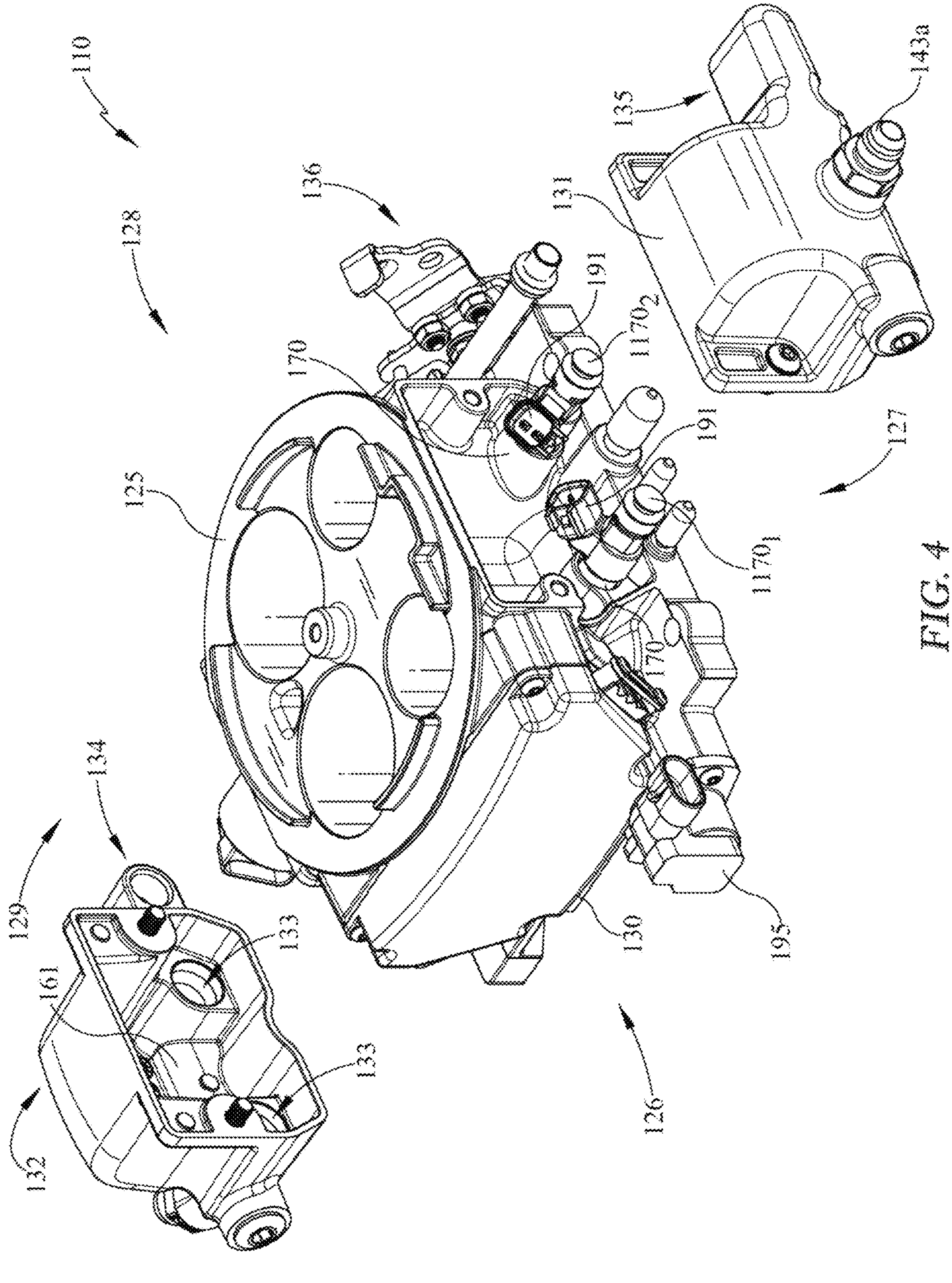
FIG. 4 is a partially exploded front perspective view of the electronic fuel injection throttle body assembly.

In some embodiments, each fuel component covers 131, 132 may include a connecting fuel passage 161 (FIG. 4). These fuel passages 161 may be oriented substantially horizontally between injectors $\mathbf{1170}_x$. Fuel is routed to both fuel covers 131, 132, and this may be achieved in a variety of methods. In the depicted embodiments, a fuel crossover tube 160 may be used to fluidly connect the covers 131, 132.

On the opposite side 129 from the inlet 142, is an outlet 159. Similar to the inlet 142, the outlet 159 is shown with two fittings 159*a* and 159*b*, either of which may be plumbed for use and the other of which remains plugged during use. The outlet 159 is formed as part of the fuel component cover 132. Both of the fuel component covers 131, 132 are removable for maintenance and during installation of the assembly 110. The fuel is directed through the outlet 159 after all injectors have been charged and only at that time does the fuel return to a fuel tank or regulator. In other embodiments, the fuel plumbing may be a returnless system where fuel is supplied to one side of the throttle assembly at either the inlet or the outlet, and the other of the inlet and outlet side are plugged so that fuel does not return to a fuel tank. With brief reference to FIG. 7, the fuel flow is depicted by arrows moving through the assembly 110. In alternative returnless fuel flow arrangement, the arrows could be in the direction depicted or in an opposite direction. Additionally, while two inlets and two outlets are shown, various numbers of either inlets or outlets may be utilized and the number of inlets and outlets may be the same or may differ.

Also shown in the view of FIG. 2, are a plurality of bores 140. The bores 140 are spaced about an upper surface of the flange 125 and are comprised of differing sizes. The bores 140 provide a mixture of air and fuel to the engine manifold. In some embodiments the bores 140*a* are smaller and the bores 140*b* are larger. This allows operation of the engine in two manners. First, by way of fuel delivery from the small bores 140*a* in fuel efficient driving conditions. However, when higher performance is desired, the larger bores 140*b* are utilized, in addition to the small bores 140*a*, to deliver additional fuel and air to the engine, thereby providing additional horsepower. The bores 140*a* may be aligned in a horizontal direction between one pair of sides and the bores 140*b* may be aligned similarly. Further, the small bores 140*a* are spread farther apart than the larger bores 140*b*.

The upper surface of the flange 125 may include one or more locating features disposed thereon to locate an air filter thereon. The features may be wall like structures extending upwardly which inhibit rotation of the air filter due to engine vibration.

Figure 3:
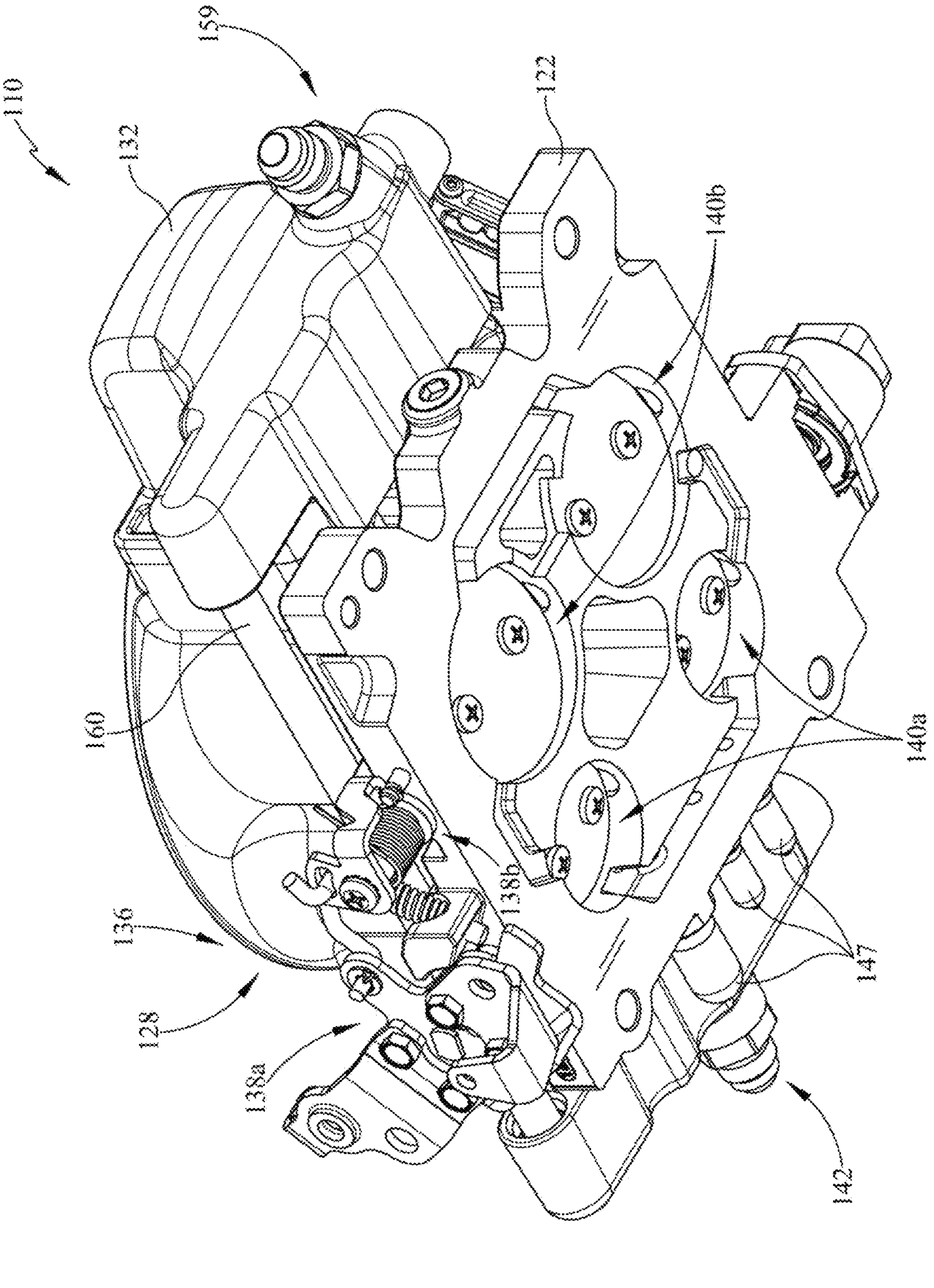
FIG. 3 is a lower perspective view of the electronic injection throttle body assembly.

Referring now to FIG. 3, a lower rear perspective view of the assembly 110 is depicted. In this view, the lower side portion of the assembly 110 is shown for description. Whereas the upper end of the bores 140 define an inlet, the lower end of the bores 140 define an outlet which is in flow communication with the engine manifold and provides fuel and air mixture to the manifold.

Extending between the fuel component covers 131 (FIG. 2), 132 is the fuel crossover tube 160. The fuel circuit is arranged as follows. The fuel enters at the fuel inlet 142 and passes through the fuel component cover 131. Within the fuel component cover 131, the fuel is delivered to the one or more fuel injectors $\mathbf{1170}_{1,2}$ (FIG. 4) therein. Once the fuel injectors $\mathbf{1170}_{1,2}$ are pressurized, the fuel then passes through the fuel crossover tube 160 and to the second fuel component cover 132. In the second fuel component cover 132, the fuel is delivered to fuel injectors $\mathbf{1170}_{3,\,4}$ therein until they are also pressurized. Afterward, the fuel may pass to the fuel outlet 159 which is generally located at a corner of the fuel component cover 132. Upon exiting the second component cover 132, the fuel may return to a fuel tank in the vehicle or recirculate back to the inlet side of the electronic fuel injection throttle body assembly 110.

FIG. 3 also illustrates that the base 122 may include various pipe ports 147 where, for example where some vehicle engines require vacuum ports. For example, a manifold vacuum port, distributor spark and/or other services may be provided along, or near the base 122 and on the throttle body 120. The ports 147 may be plugged at time of manufacture and unplugged by the end user to make these ports functional.

The rear side 128 of the assembly 110 also reveals a throttle lever assembly 136. The throttle lever assembly 136 includes a throttle shaft 138 extending through the bores 140 and valves or valve plates 139. The lever assembly 136 causes opening or closing of the valve or valve plates 139 by rotating the shaft 138. When view from the top of the bores 140, the shaft 138 may be above or below the valve plates 139. Further, since the bores 140 are not all utilized at the same time, the valves are configured to open at different rates. Specifically, the valves 139 associated with the small bores 140*a* are continuously operating and the valves of the large bores 140*b* open when the valves of the small bore reach a preselected position and additional performance from the engine is required. When the small valves are fully open however, the large valves will also be fully opened to provide maximum engine performance. The instant embodiment provides a first throttle shaft 138*a* which extends through the small bores 140*a* and a second throttle shaft 138*b* which extends through the large bores 140*b*.

Figure 5:
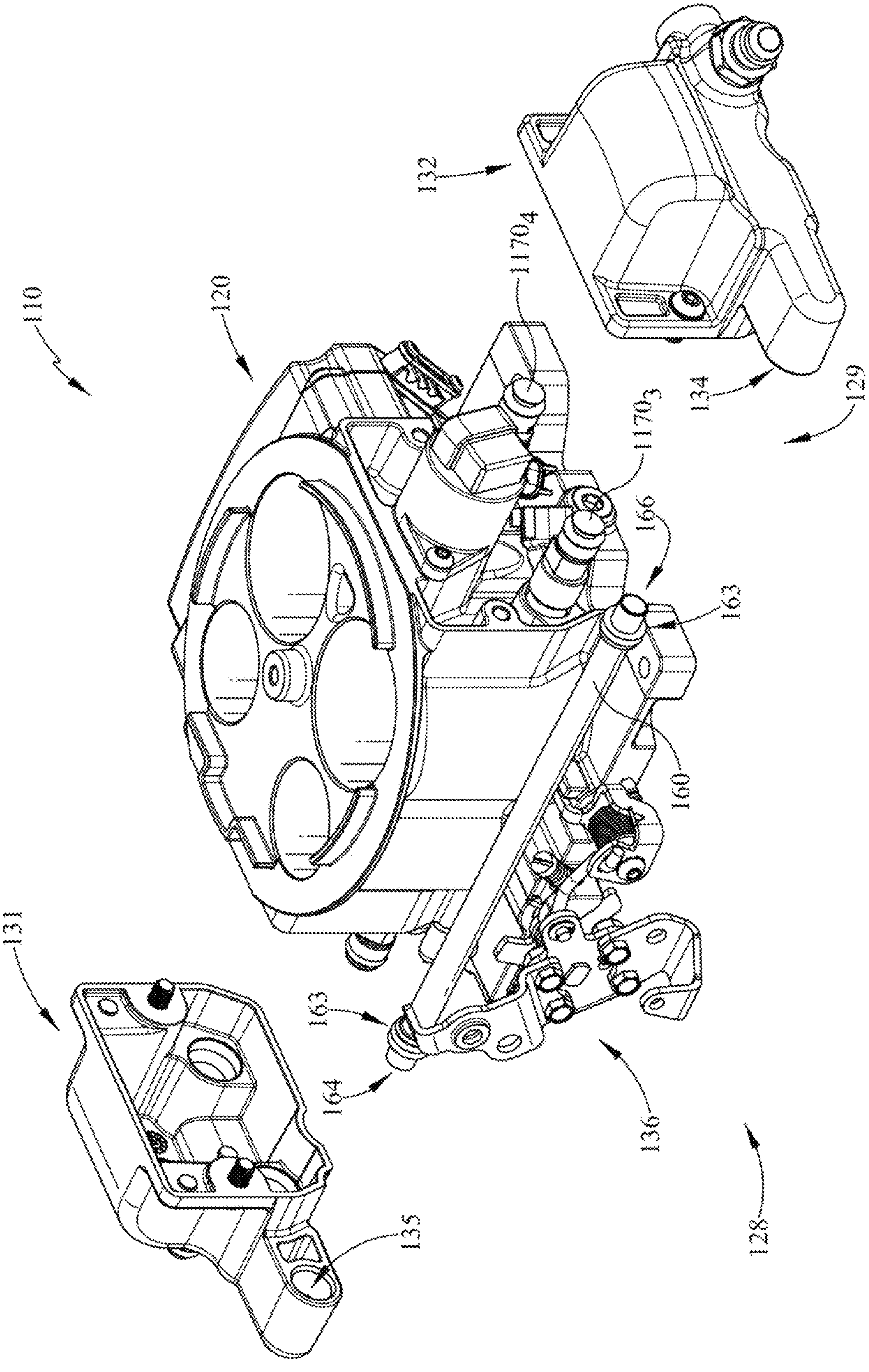
FIG. 5 is a partially exploded rear perspective view of the electronic fuel injection throttle body assembly.

With reference now to FIGS. 4 and 5, exploded perspective views of the throttle body assembly 110 are shown with the assembly 110 rotated to provide view of the first side 127 and the opposite second side 129. Referring first to FIG. 4, an exploded assembly 110 is shown from the first side 127. The inlet fuel component cover 131 to reveal two fuel injectors $\mathbf{1170}_{1,2}$ which are disposed in ports 170. The fuel may enter the inlet fitting 143*a*, for example, and pass through an internal passage 161 (FIG. 4) of the component cover 131. The fuel passage 161 is in flow communication with the fuel injectors $\mathbf{1170}_x$ and the fuel moves to a crossover port 135 which is in flow communication with the crossover tube 160.

In the view, the fuel injectors $\mathbf{1170}_x$ are also shown with electrical connectors 191 which are in electrical communication with the electronic control unit 190 (FIG. 7) within the cover 130.

The inlet fuel component covers 131, 132 are exploded from their connected position on the main throttle body 120. In the depicted view, the interior of the fuel component cover 132 is shown. In this view the fuel injector ports 133 are shown which receive a portion of the fuel injectors $\mathbf{1170}_x$ which are on the undepicted side 129 of the throttle assembly 110. A fuel passage 161 is also shown in the fuel component cover 132 and extending between the ports 133. The passage 161 provides fuel flow between the two fuel injectors $\mathbf{1170}_x$ from a crossover port 134.

Referring now to FIG. 5, an exploded perspective view of the electronic fuel injection throttle body assembly 110 is depicted. In this view, the rear side 128 is depicted and the fuel crossover tube 160 may be seen. The fuel crossover tube 160 has an inlet end 164 and an outlet end 166. The fuel crossover tube 160 also comprises at least one stop bead 163 near each end of the tube 160. The stop beads 163 provide one side of an O-ring groove or pocket better shown in FIG. 6 and prevent the blow out of the O-rings 165 due to fluid pressure. Each port 135, 134 receives an end of the crossover tube 160 such that the crossover tube 160 is captured between the fuel component covers 131, 132. Once the component covers 131, 132 are fastened in position on the throttle body 120, the crossover tube 160 is locked in position. In some embodiments, the fuel cross over tube may be rigid or may be flexible. In these embodiments, the term “capture” is also intended to cover, but not be limited to, assemblies wherein an additional fastener or fastening mechanism may be utilized to achieve the capture, for example where a flexible tube is utilized.

Figure 6:
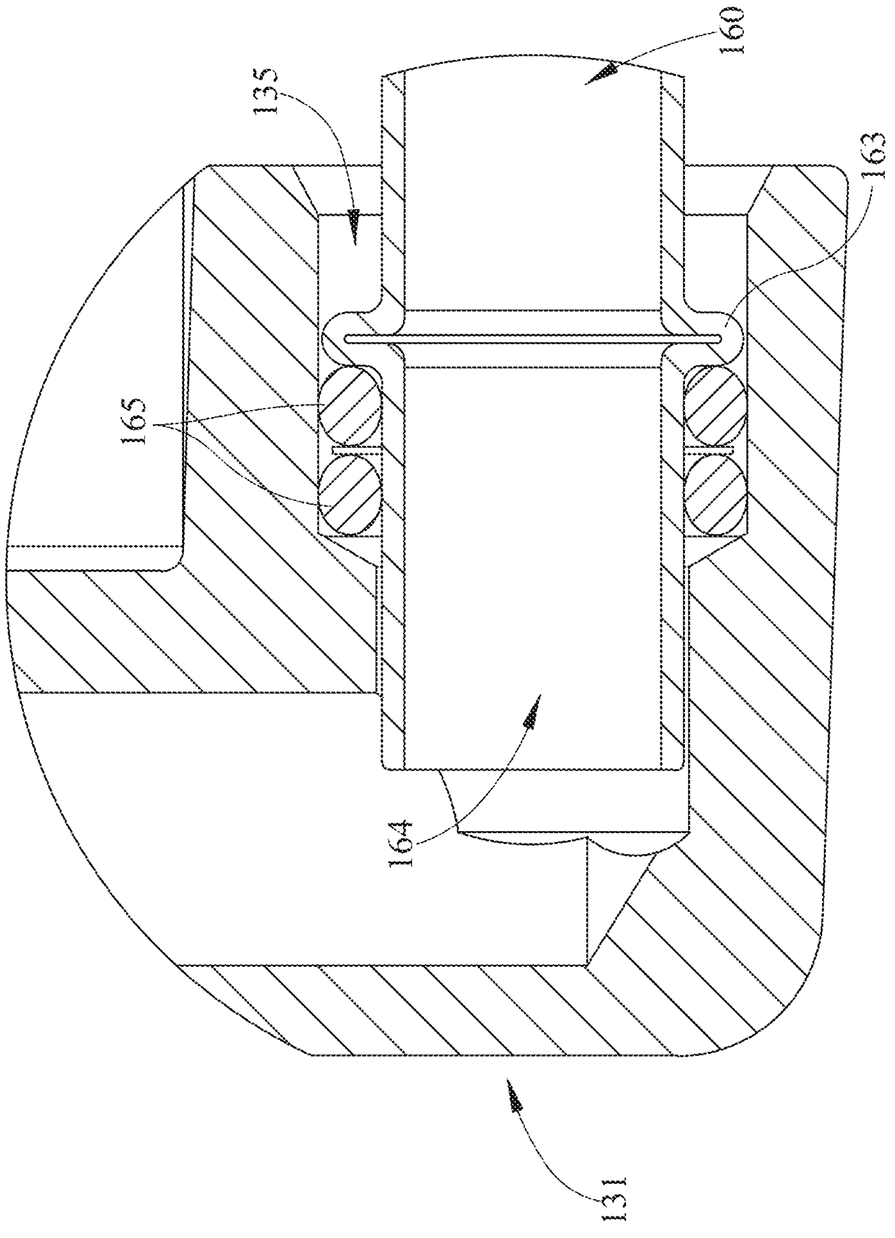
FIG. 6 is a detailed section view of an engagement of one end of a fuel crossover tube and a fuel component cover.

With reference now to FIG. 6, a detail section view of the fuel crossover tube 160 is shown positioned in one of the fuel component covers, for example cover 131. The crossover tube 160 includes the stop bead 163 retains the one or more O-rings or other seals 165. The stop bead 163 is shown with a rounded or curved section shape but other shapes may be utilized which allow for the friction and/or interference fit with the port 135. Further, the crossover tube 160 may further comprise one or more O-rings 165 which also engage an inner surface of the port 135. O-rings 165 may be formed of an elastic material or may be formed of a metal. Further, the O-ring 165 may be two O-rings wherein one serves as a primary O-ring and the second serves as a secondary O-ring. According to some alternatives, other structure may be used as a seal instead of the O-rings.

Figure 7:
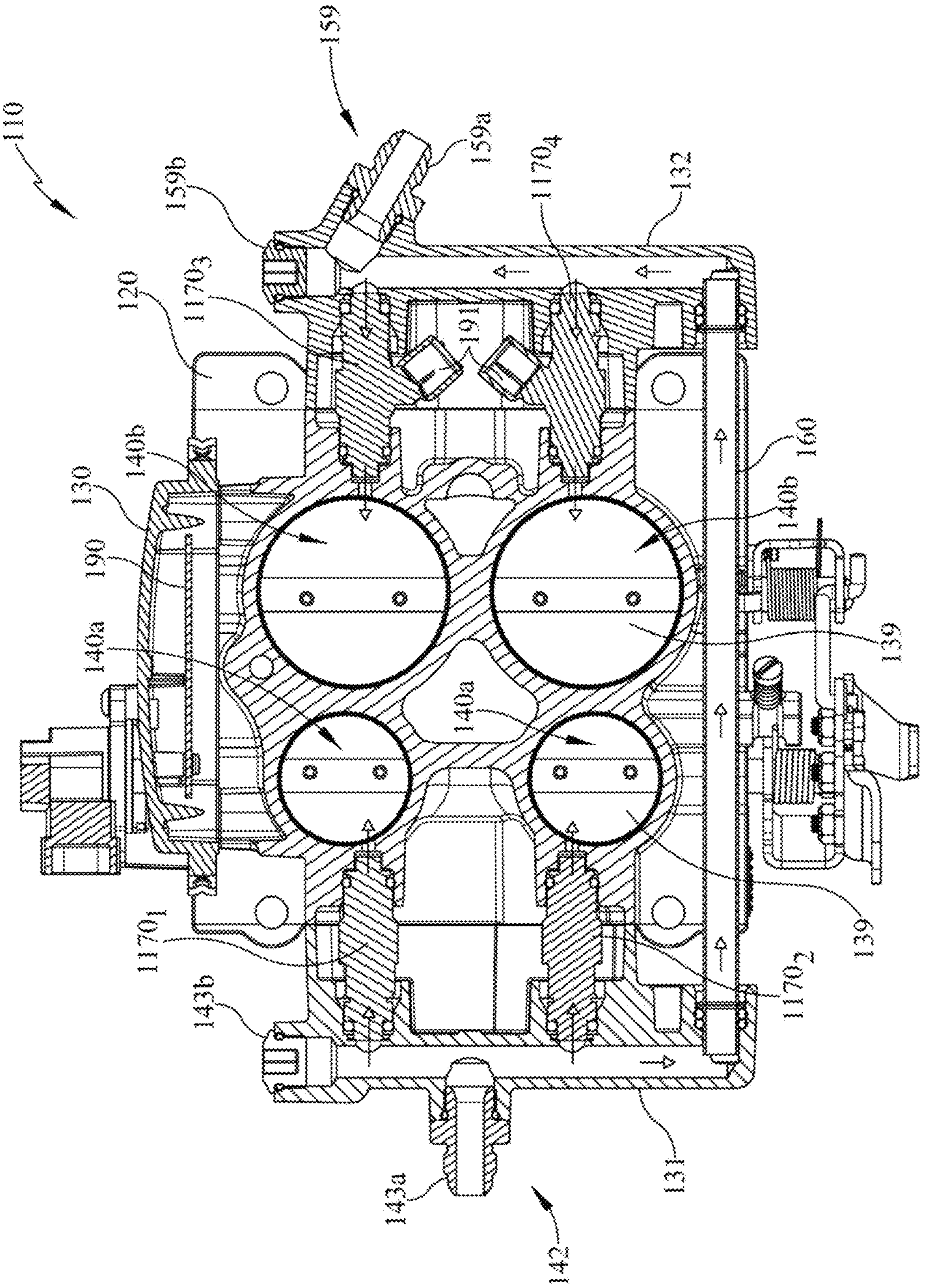
FIG. 7 is an upper section view of the throttle body assembly of FIG. 1.

With reference now to FIG. 7, a top section view is provided of an illustrative assembly 110. The illustrative assembly 110 is shown to depict the fuel flow through the assembly 110 from the inlet 142 to the outlet 159. Starting at the left hand side of the Figure, the inlet 142 is shown with fitting 143*a* in position for use and the plug 143*b*, also shown. Throughout this specification, the term “plug” may be interchanged with “fitting” as a plug is considered one type of fitting. The two fittings are shown and either may be used depending on the fuel lines in the vehicle engine. Further, it should be understood that the fitting 143*a* and plug 143*b* positions may be reversed. The fuel inlet 142 provides fuel into the fuel component cover 131 and to each of the fuel injectors $\mathbf{1170}_{1\text{-}2}$ depicted. The fuel injectors $\mathbf{1170}_{1\text{-}2}$ may be horizontally positioned or may be at an angle in a vertical plane to a horizontal axis. Similarly, the fuel injectors $\mathbf{1170}_1$, $\mathbf{1170}_2$ may be centered relative to bores 140*a* or may be off-center as shown.

As previously described, once the fuel injectors $\mathbf{1170}_{1,2}$ are pressurized, the fuel is directed from the fuel component cover 131 to the fuel crossover tube 160. As the fuel passes through the fuel crossover tube 160, the fuel moves to the fuel component cover 132. Within the component cover 132 are the fuel injectors $\mathbf{1170}_{3,\ 4}$ and these injectors direct fuel into the bores 140*b*. The fuel injectors $\mathbf{1170}_{3,\ 4}$ are shown in a horizontal arrangement relative to a vertical plane and may be centered or off center relative to the bores 140*b*. Once this side of the assembly 110 is pressurized with fuel, the fuel may pass through the outlet 159 at either of fittings 159*a*, 159*b*.

Also shown in FIG. 7 is an electronic control unit (ECU) 190 which is disposed within the ECU cover 130. The cover 130 is connected to the throttle body 120, for example by fasteners or otherwise removably connected. The electronic control unit 190 may be a printed circuit board, and may further comprise memory to which operating code may be flashed. The electronic control unit 190 may be connected to the cover 130 for example by one or more fasteners and may also be potted to reduce effects of contaminants, water, noise, vibration or other environmental influences. Alternatively, the electronic control unit 190 may be connected to the throttle body 120 and then covered by the cover 130. The electronic control unit 190 or “controller” is used herein generally to describe various apparatus relating to the monitoring of engine data, user input and the performance of one or more actions in response to occurrence of certain engine sensor data or action from user. A controller can be implemented in numerous ways (e.g., such as with dedicated hardware) to perform various functions discussed herein. A “processor” is one example of a controller which employs one or more microprocessors that may be programmed using software (e.g., microcode) to perform various functions discussed herein. A controller may also include a printed circuit board and may be implemented with or without employing a processor, and also may be implemented as a combination of dedicated hardware to perform some functions and a processor (e.g., one or more programmed microprocessors and associated circuitry) to perform other functions. Examples of controller components that may be employed in various implementations include, but are not limited to, conventional microprocessors, application specific integrated circuits (ASICs), and field-programmable gate arrays (FPGAs).

In various implementations, a processor or controller may be associated with one or more storage media (generically referred to herein as "memory" e.g., volatile and non-volatile computer memory such as RAM, PROM, EPROM, and EEPROM, floppy disks, compact disks, optical disks, magnetic tape, etc.). In some implementations, the memory may be encoded with one or more programs that, when executed by the controller, perform at least some of the functions discussed herein. Memory may be fixed within a processor or controller or may be transportable, such that the one or more programs stored thereon can be loaded into a processor or controller so as to implement various aspects of implementations disclosed herein.

The ECU 190 may also have integrated into its circuitry a Manifold Absolute Pressure (MAP) sensor and/or Intake Air Temperature (IAT) sensor. Both the MAP and IAT sensors provide feedback to the ECU 190 on environmental conditions that effect the fuel requirements of the engine for proper combustion of the air/fuel mixture. For example, the MAP sensor monitors the absolute air pressure below the throttle valve plates at the engine manifold and the IAT sensor monitors the temperature of the air entering the bores 140.

Figure 8:
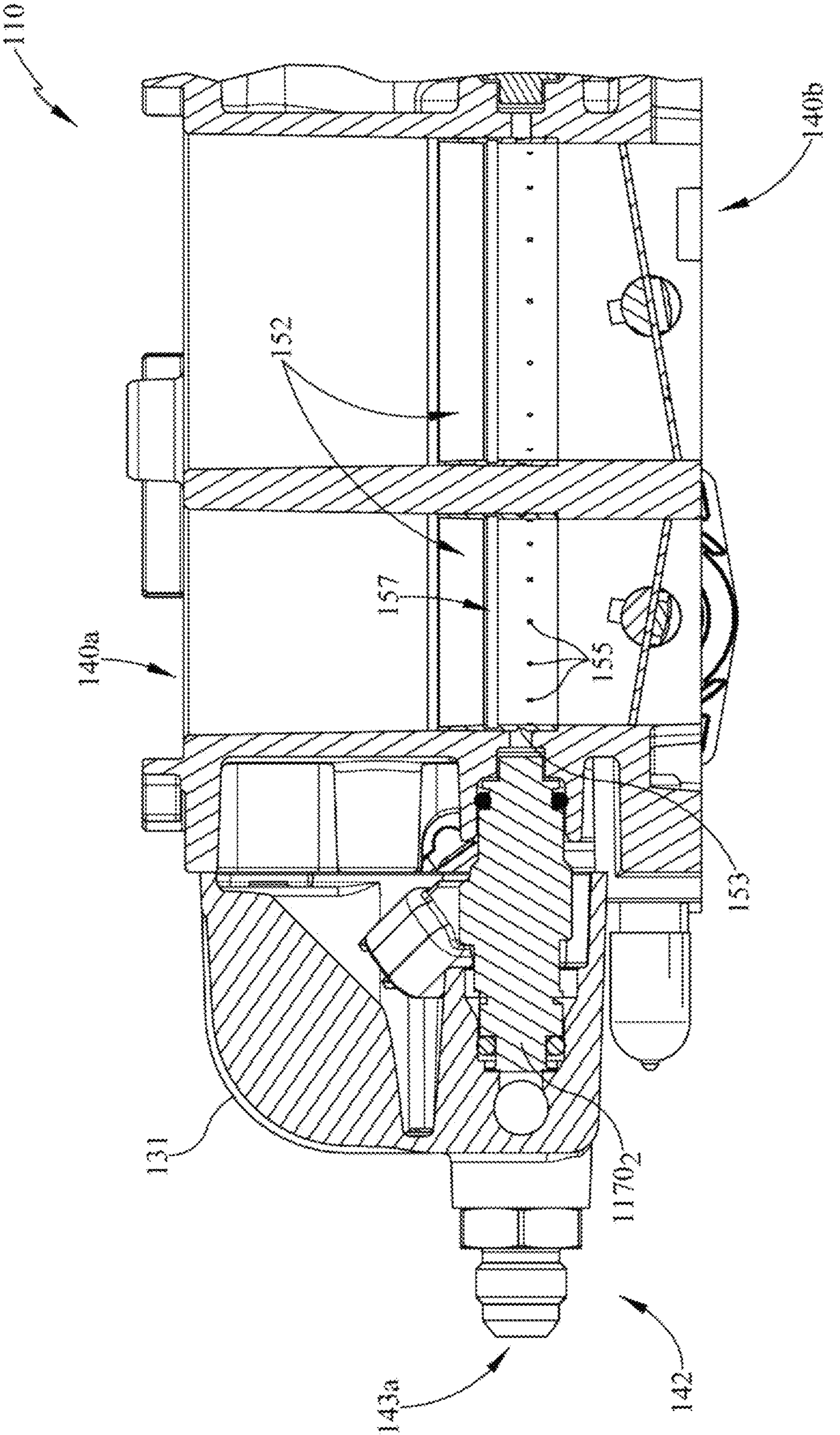
FIG. 8 is a side section view of the throttle body assembly of FIG. 1 wherein the fuel injectors of two bores are at least partially depicted.

Referring now to FIG. 8, a partial side section view the throttle body assembly 110. The view provides a vertical section, as opposed to the horizontal section of the previous view. In this view, the inlet 142 is shown on the left hand side of the Figure and fuel enters through the inlet fitting 143*a*. The fuel injector $\mathbf{1170_2}$ is shown in a horizontal orientation relative to the vertical plane. The injector $\mathbf{1170_2}$ however may be at angles to a horizontal axis in the vertical plane. Further, as shown in the previous view, the fuel injector $\mathbf{1170_2}$ may be off-center relative to the bores 140*a*.

Within the throttle body assembly 110 the injectors $\mathbf{1170_{1\text{-}4}}$ deliver fuel as directed by the electronic control unit 190 to the bores 140*a*, 140*b*. The bores 140*a* include an aperture through which fuel passes from the injector 1170*x* to a fuel ring or sleeve 152. The ring or sleeve 152 is generally cylindrical in shape and has hollowed interior with open ends to allow airflow through the bore and the fuel ring 152. The ring or sleeve 152 seals the hole in communication with the injector 1170*x*. A channel 153 is defined between the wall of the bore 140*a* and the external surface of the ring 152. Fuel is directed through channel 153 in a circular direction on the outer surface of the ring 152. The channel 153 is also in flow communication with a plurality of apertures 155 so that the pressurized fuel passes through these aperture 155 mixing with air passing from the upper end of the bore 140*a*, 140*b* and the mixture passes to the engine manifold. The ring or sleeve 152 in combination with the inner diameter of the bores 140 form the channel 153 (FIG. 6) wherein fuel passes to a plurality of apertures 155 located in the rings 152. The fuel channels 153 may have different physical characteristics such as size, depth, orifice size, number, shape, etc. The configuration may allow for even greater control over engine tuning and operation. The apertures 155 direct fuel downward, upward or horizontally and further the fuel direction may be in a radial direction into the center of the ring 152 and bore 140 or at an angle to the radial direction. For example, in some embodiments, the fuel may spray downwardly through the apertures 155 downwardly at an angle so as to inhibit fuel mist from escaping at the upper end of the bores 140. The spray mist may converge at toward the lower end of the bores 140*a*, 140*b* and mix with air passing through the bores 140*a*, 140*b* before traveling further through the engine manifold.

Also shown on the interior surface of the ring 152 is a groove 157 which may be used to move the ring 152 during installation. A tool may be inserted from one end of the bore 140*a* and expanded to engage an edge of the groove 157. Once engaged, the ring 152 may be forced upwardly, for example, or downward out of the bore 140*a*, depending on the entrance direction of the tool.

While the depicted rings 152 are shown with a single row of apertures 155, two rows of apertures may be utilized. This may be, according to some embodiments, on a single ring 152. Further, according to some other embodiments, the bore 140*a* may receive two rings 152 for example to provide two or more rows of apertures 155. In such embodiments, it may also be provided that a second fuel injector is provided in each bore 140*a*, 140*b*. The second fuel injector for example may be placed higher relative to the bore and above the depicted injectors. There may be some advantages to a stacked arrangement of fuel injectors. First, it may allow for greater overall volume of fuel injection. Second, it may provide more uniform injection of fuel into each groove as compared to a side-by-side injector configurations, where both injectors fire into a single channel. Finally, it may provide more consistent presentation of fuel to the air for more efficient mixing between atomized fuel and intake air especially in a high fuel volume application.

A second bore 140*b* is shown to the right of bore 140*a* and may have the same or differing features from those described previously. This may be dependent on various desired operating characteristics. The second bore 140*b* is larger for use when increase horsepower and performance are desired.

Figure 9:
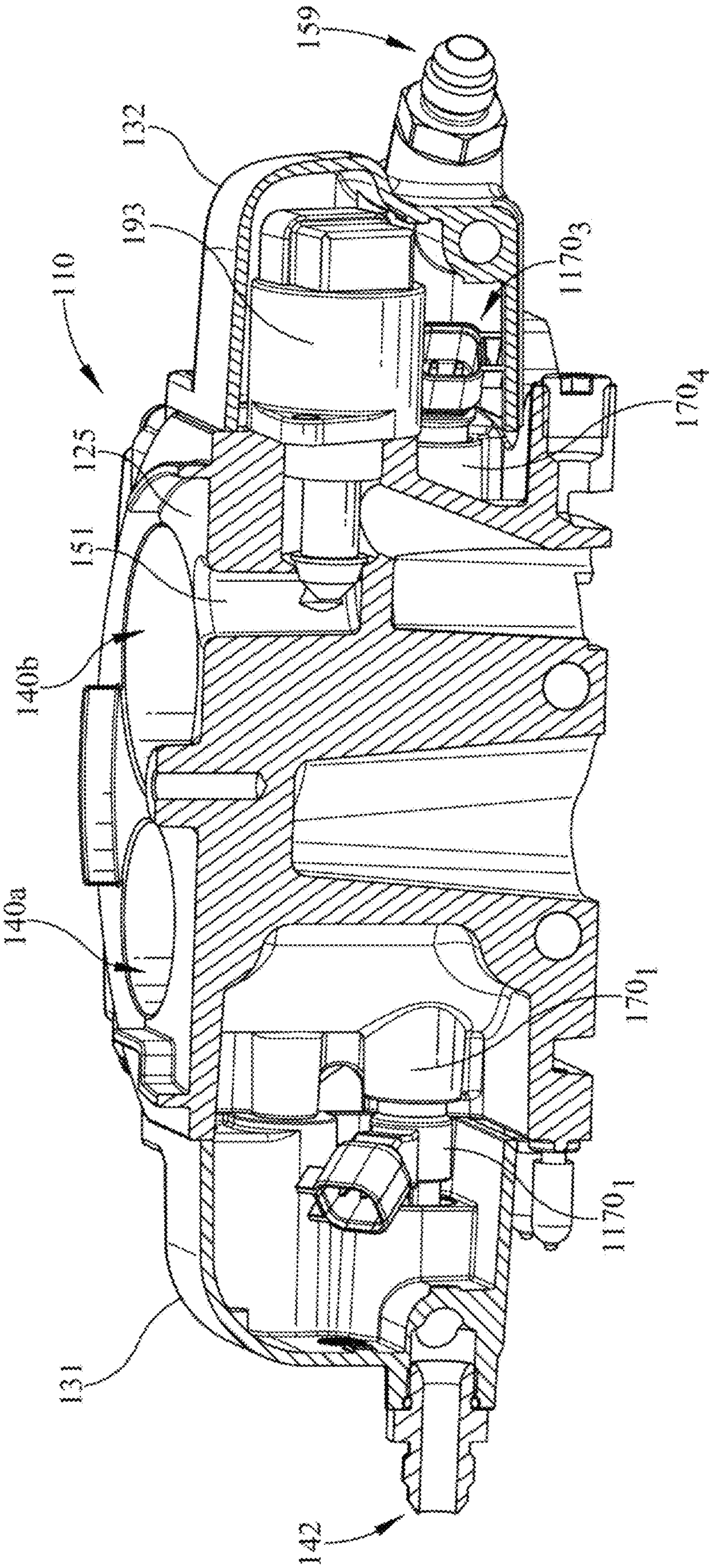
FIG. 9 is a sectioned perspective view of the throttle body assembly and further depicts the fuel injectors and the idle air control motor.

With reference now to FIG. 9, a section view of the throttle body assembly 110 is depicted with a section taken between the pairs of large bores 140*b* and small bores 140*a* in a direction between the inlet 142 side and outlet 159 side of the assembly 110. In this view, the interior of each of the fuel component covers 131, 132 is visible. On the inlet 142 side, the fuel component cover 131 a portion of the fuel injector $\mathbf{1170_1}$ is shown extending from the port 1701. To the rear of the injector $\mathbf{1170_1}$, the crossover port 135 (FIG. 5) may be seen which provides fuel to the crossover tube 160 (FIG. 5).

On the opposite side of the throttle body assembly 110, the second fuel component cover 132 is shown partially cut to reveal an idle air controller (IAC) motor 193 and valve assembly, which is in fluid communication with an airflow opening 151 extending through the upper surface of the flange 125. Additionally, the IAC motor 193 may be partially disposed in one of the covers 131, 132. The IAC motor 193 controls engine idle airflow condition via a stepper, or other, motor, and the attached valve which meters airflow to the engine manifold and is in communication with and controlled by, the engine control unit 190.

As compared to the smaller bores 140*a*, the fuel injectors $\mathbf{1170_{3,\,4}}$ of the larger bores 140*b* may be located at the same height or at a different height that the injectors $\mathbf{1170_{1,2}}$ of the smaller bores 140*a*.

Figure 10:
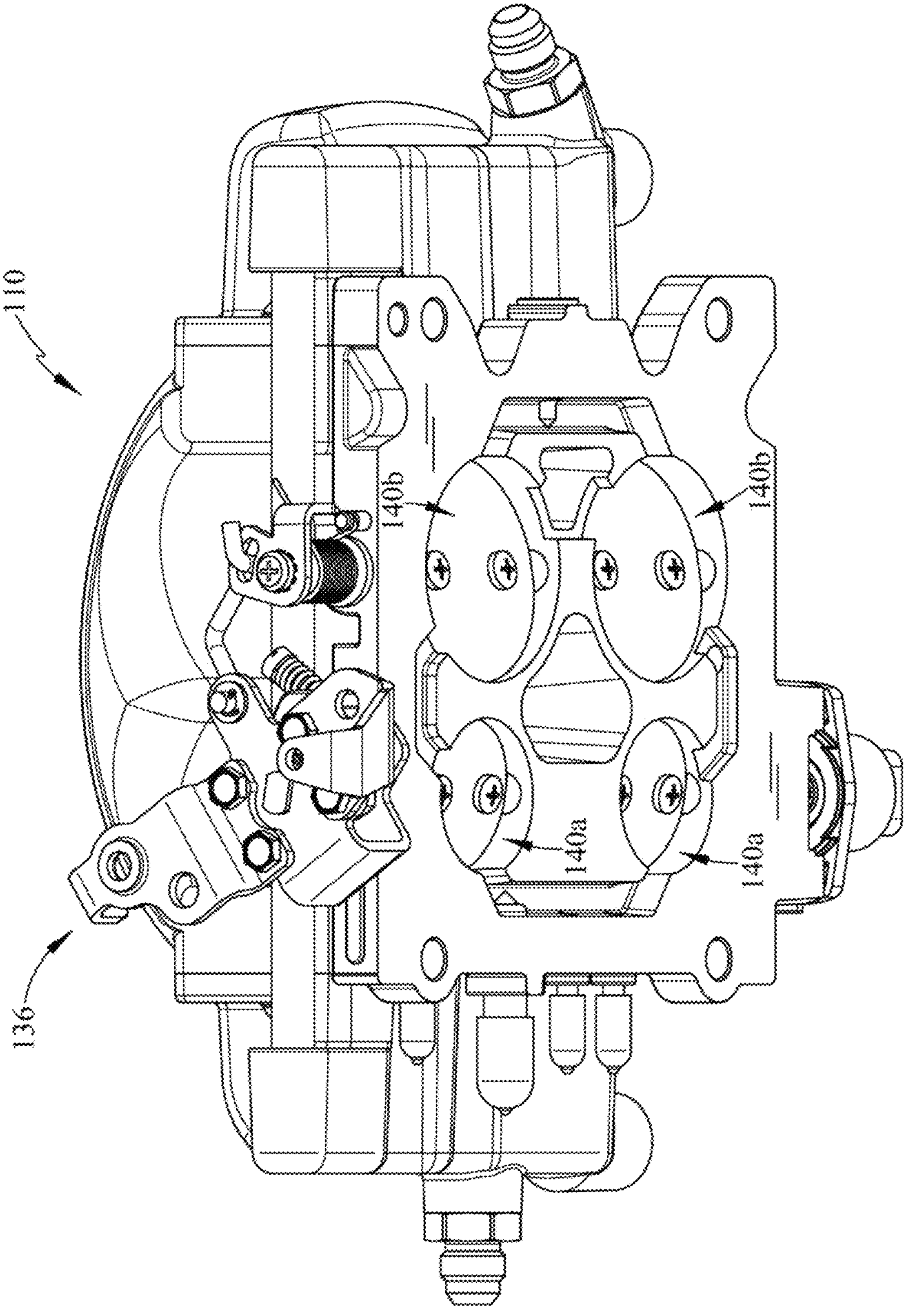
FIG. 10 is a first sequence view of a throttle valve configuration is a first position.
Figure 11:
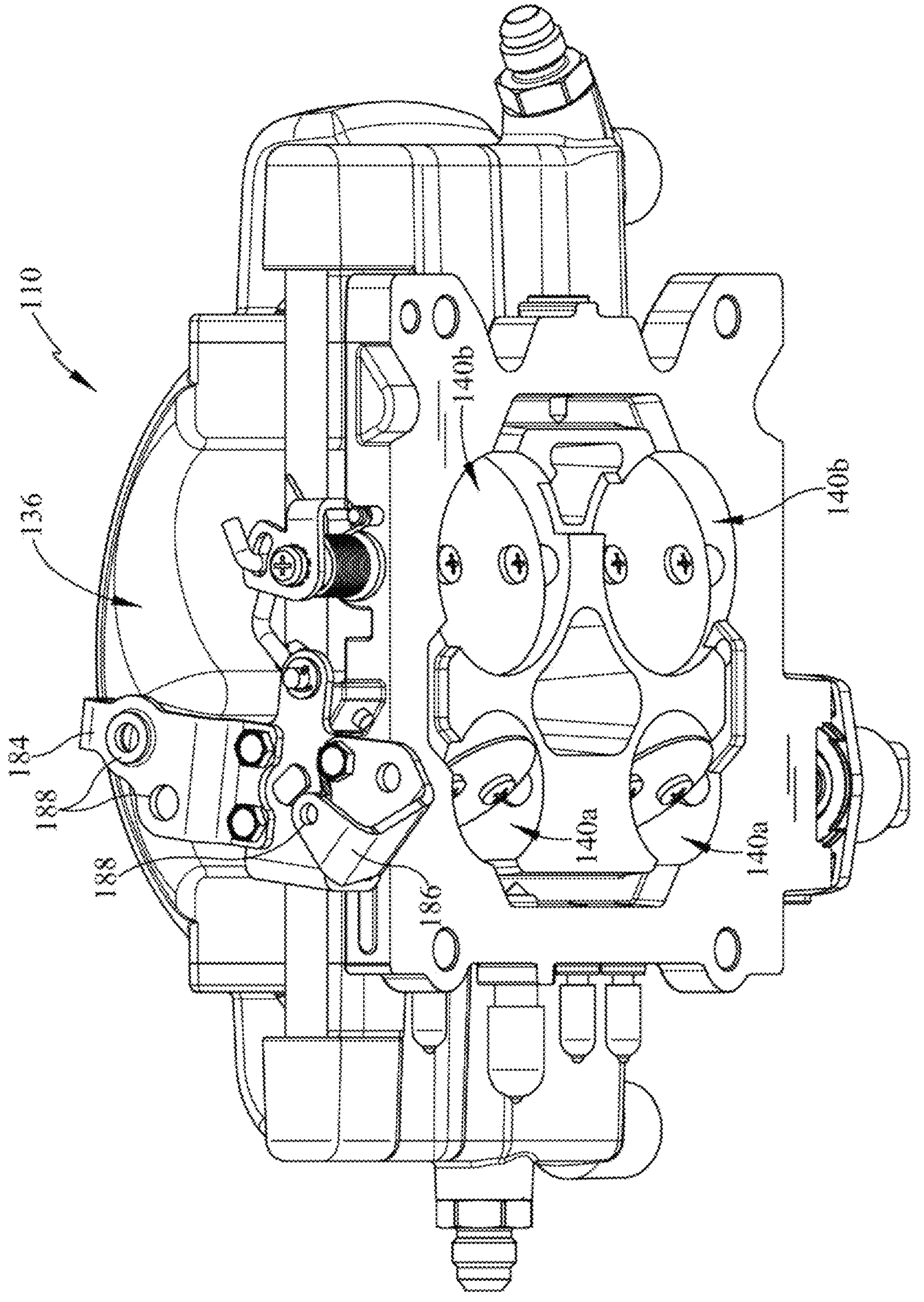
FIG. 11 is a second sequence view of a throttle valve configuration in a second position.
Figure 12:
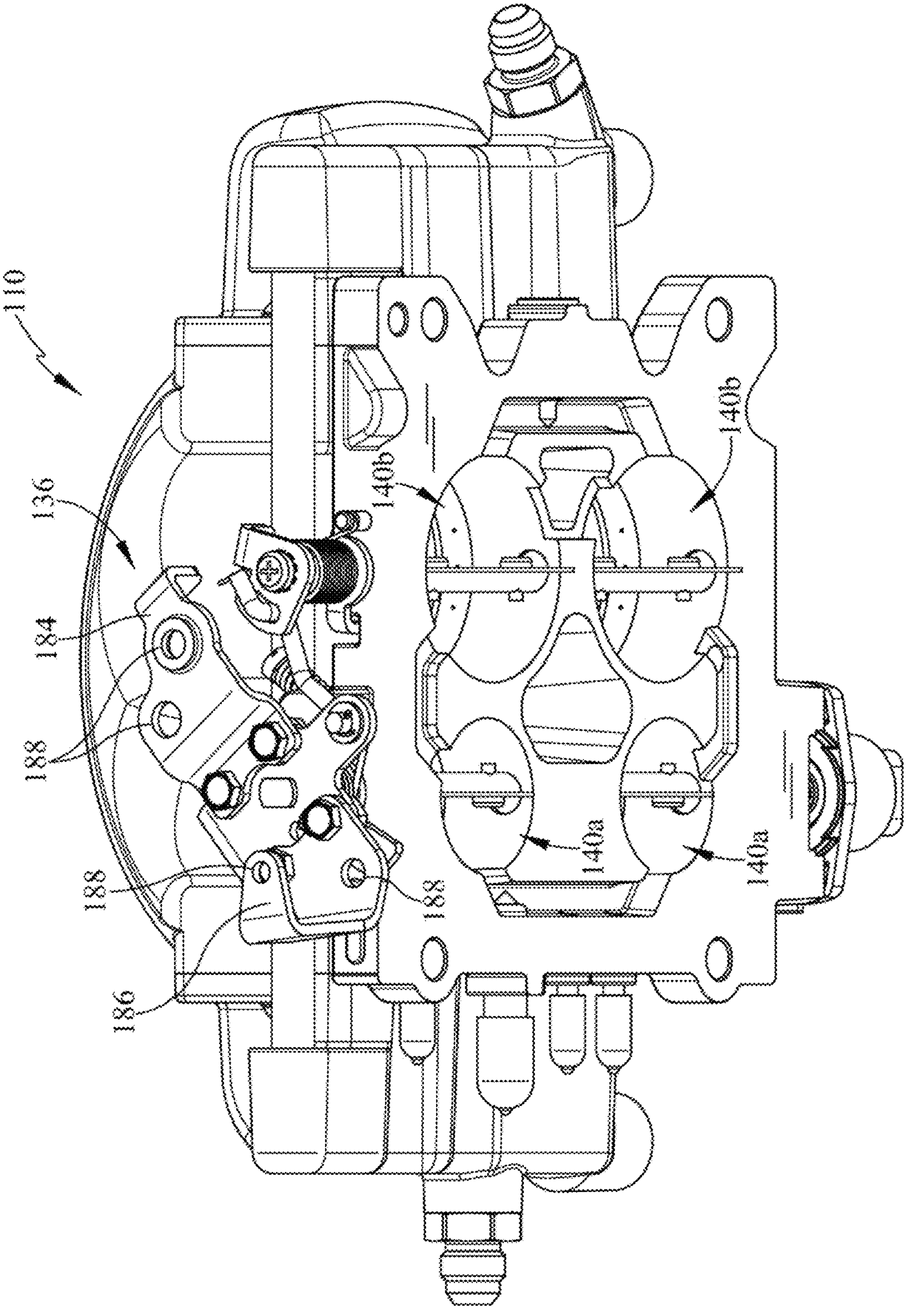
FIG. 12 is a third sequence view of a throttle valve configuration in a third position.

With reference now to FIGS. 10-12, a sequence of views are provided for description of operation of the throttle valves of the throttle lever assembly 136. As noted previously, the primary bores 140*a* (FIG. 9) are used during normal driving for more fuel efficient operation. However, during times when additional horsepower is needed, the secondary bores 140*b* open as well.

Referring first to FIG. 10, the primary and secondary bores 140*a*, 140*b* are shown in an idle condition wherein the bores 140*b* are substantially closed and primary bores 140*a* are slightly opened by the respective valves.

With additional reference now to FIG. 11, the valves of primary bores 140*a* are shown partially opened while the valves of the secondary bore 140*b* are shown just before they begin to open. For example the throttle position may be at 60% of maximum throttle, as opposed to FIG. 10. One skilled in the art will realize that the valves are opening at different rates and that as additional performance is needed, the valves of the secondary bores 140*b* begin to open at a faster rate of change than the primary valves. This allows the valves of bores 140*a*, 140*b* to reach fully open at the same time.

As the throttle position continues to increase to a maximum, the valves continue to open. With reference now to FIG. 12, the throttle is shown in a maximum position. The valves are both fully open when the throttle reaches maximum. Thus, the throttle valves start movement at different times and move at different rates, but reach fully opened positions for maximum throttle at or near the same time.

The throttle lever assembly 136 is also shown in the FIGS. 10-12. The throttle lever assembly 136 is shown in a first position in FIG. 10. When compared with FIG. 11, the upper portion of the lever assembly 136 is shown rotated to the right depicting the throttle around 60% open. Finally, the upper portion of throttle lever assembly 136 is shown in FIG. 12 is shown rotated further right in the fully opened position.

Figure 13:
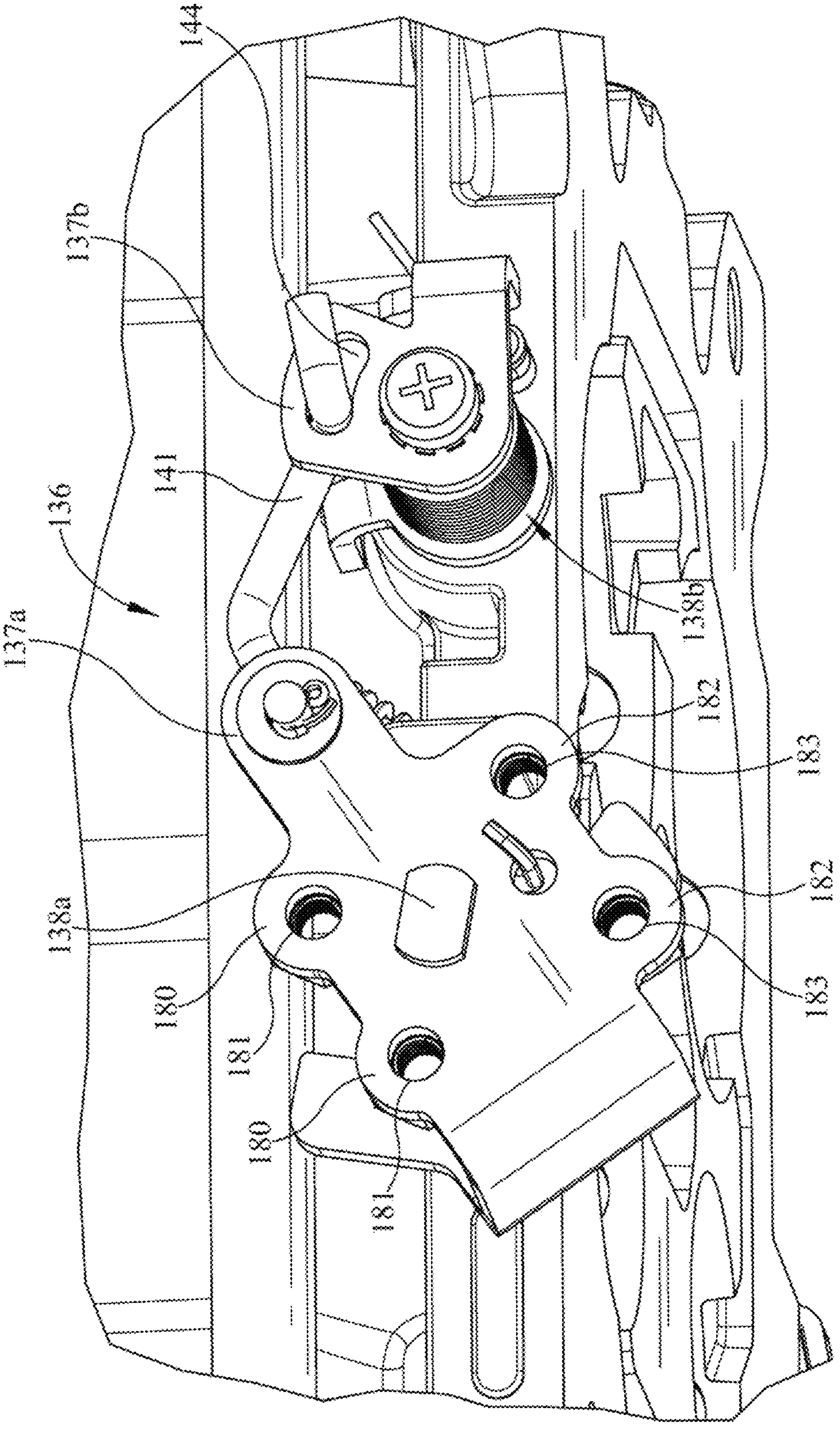
FIG. 13 is a detail perspective view of the throttle lever assembly.

With reference now to FIG. 13, a detail perspective view of the throttle lever assembly 136 is shown. The throttle lever assembly 136 also allows for the progressive opening and closing. The assembly 136 allows for the differing operating movements and rates of the throttle valves. As shown in the Figure, the throttle lever assembly 136 comprises a primary throttle lever 137*a*. The assembly 136 is in communication with a mechanical throttle linkage (not shown) for example, which causes movement of the lever assembly 136 and specifically a throttle shaft 138*a* connected to the lever assembly 136. The term throttle linkage may include various types of devices which cause movement of the throttle lever assembly 136 including but not limited to: wire(s), rod(s), plate(s), other structures or combinations thereof which move the assembly 136 to function. Additionally, in the embodiments where there are four bores, a second shaft 138*b* may be utilized. The second shaft 138*b* is hidden by a torsion spring but the shaft 138*b* is also connected to a second throttle lever 137*b*.

As previously noted, the valves of the primary (small) bores 140*a* and the secondary (large) bores 140*b* do not open and close at the same rate. Accordingly, the throttle lever 137*a* rotates some amount before the rotation of second throttle lever 137*b* and shaft 138*b* begins motion. The throttle lever assembly 136 comprises a throttle link, or linkage, 141 to drive and/or rotate a second lever 137*b* and shaft 138*b*. The second lever 137*b* has an arcuate opening 144 for engagement of the throttle link 141 which allows some movement of the first lever 137*a* before the second lever 137*b* begins to move. The shape of the opening 144 may be varied to affect when the secondary shaft 138*b* rotates and at what rate the opening of the valve occurs relative to the primary shaft 138*a* and primary valves. Also, the length and/or form of the throttle link 141 may be varied to change the timing of the opening of secondary valves. In the instant embodiment, the throttle link 141 is fixed and not adjustable. However in other embodiments, this throttle link 141 may be adjustable by bending or varying the length with a threaded rod for example. With rotation of the shaft 138*a*, valve plates 139 (FIG. 5) located within the at least one bore 140*a*, 140*b* may rotate based on fuel/air need. At the opposite side of the throttle body 120, from the lever assembly 136 may be a throttle position sensor 195 (FIG. 4) which provides communication to the electronic control unit 190 (FIG. 7) concealed by the cover 130. The throttle link, or linkage, 141, may be formed of a single rod as shown, or may defined by a wire, threaded rod, other structures or combinations of these.

In the instant embodiment, all of the throttle lever assembly 136 is provided on a single side of the throttle body assembly 110. This inhibits interference of moving parts with other non-moving parts such as wires. This also makes easier the wire routing process, so that only one area of the assembly 110 has to be avoided.

Still further, the first lever 137*a* is shown in a different form than in the previous figures. In the instant embodiment, the lever 137*a* is shown with upper lobes 180 and lower lobes 182 each with fastening apertures 181, 183. The lobes 180 allow for connection of additional lever arms 184, 186 which are shown in the previous figures. The ability to connect the modular lever arms 184, 186 allow for various installation configurations and connection locations. In turn, this allows for use of the EFI throttle body assembly 110 in a variety of engine types, any of which may require different mounting configuration due to throttle linkages. With additional reference to FIGS. 10-12, in the instant embodiment, a first modular lever arm 192 may be connected to the lobes 180 and a second modular lever arm 194 may be connected to the lower lobes 182. The first and second arms may be used together or independently.

The lever arms 184, 186 may include one or more holes 188 or other connecting locations wherein throttle linkage and transmission linkage structures may be connected. The plurality of holes provide for various options which may be desirable for use in a plurality of configurations. This provides some modularity for use in different applications, which is highly desirable.

Figure 14:
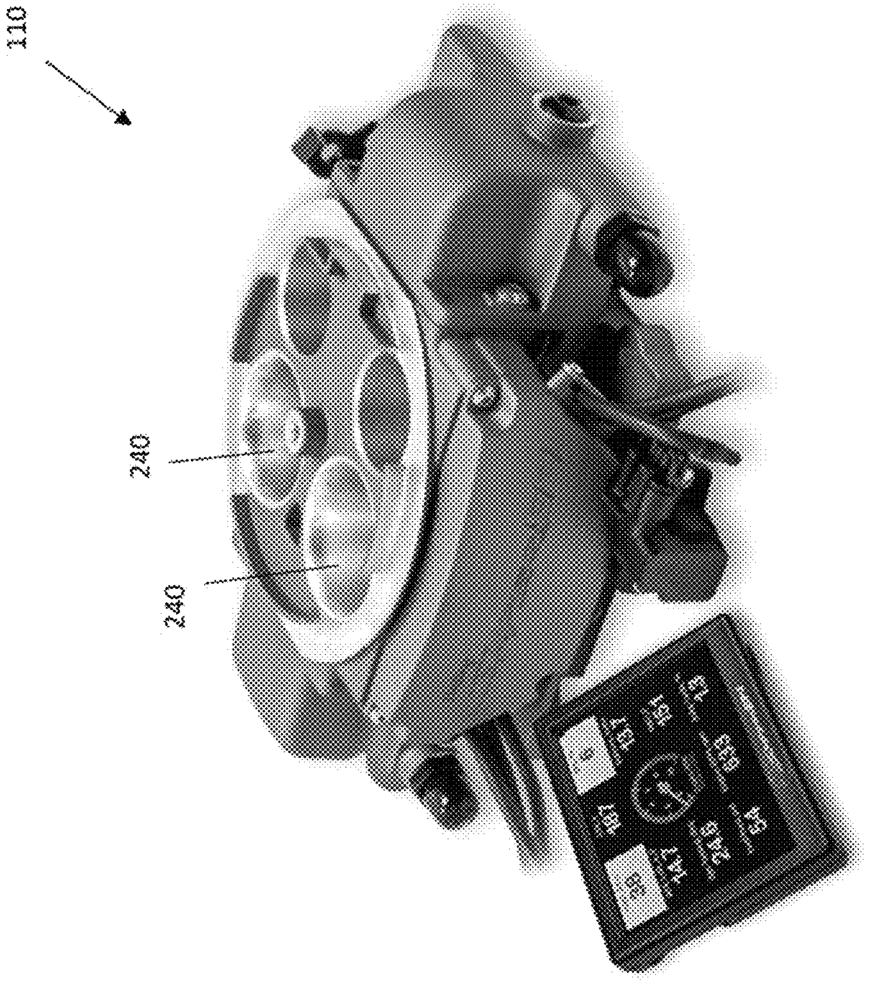
FIG. 14 is a perspective view of an alternate embodiment of the throttle body assembly.

With reference to FIG. 14, a perspective view of an alternate embodiment is provided. The throttle body assembly may be any of the embodiments previously described, all of which are incorporated by reference herein. The instant embodiment provides for an insert in the larger bores to increase airflow in smaller engines. As will be understood by one skilled in the art, with smaller engines, the airflow through the throttle body assembly may be less and therefore the mixture of fuel and air may need some improvement.

The instant embodiment provides inserts 240 in the larger bores in order to increase airflow speed and therefore improve function of the fluid mixing. With additional reference now to FIGS. 15-17, various views are provided to describe how the additional inserts are formed and how they appear.

Figure 15:
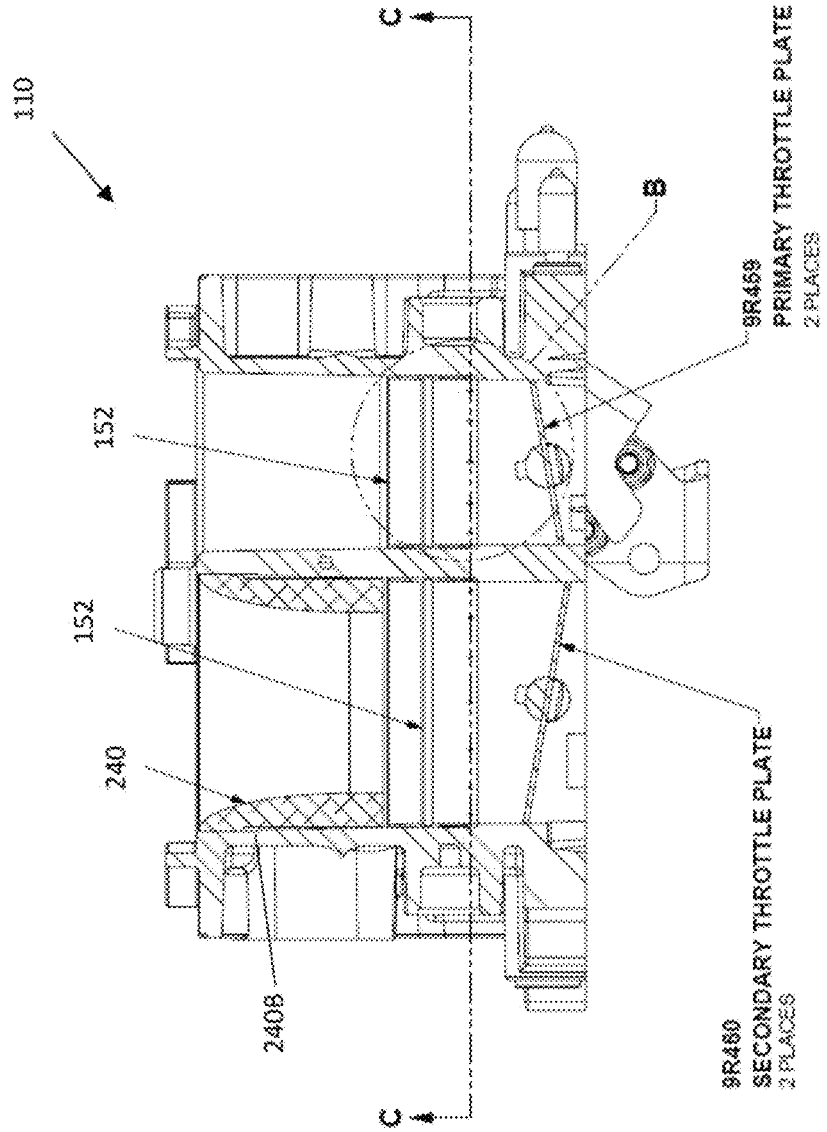
FIG. 15 is a side section perspective view of the throttle body assembly of FIG. 14.

In the section view of FIG. 15, the throttle body assembly 110 is sectioned so that the interior view of the throttle body is shown. The bores 240B are notched slightly at an upper end to receive the inserts 240. The inserts 240 are then press fit into the bores 240B. It may be desirable that the upper edges of the inserts 240 be flush with the upper edge of the bores 240B, so that it is not immediately visible or apparent that the part 240 is an insert.

In the section view, it is also shown that the insert 240 has wide diameter at the upper end and a smaller diameter toward the lower end. It may be desirable again to provide a belief that the larger bores 240B are same size as the larger bores without the insert. Accordingly, the section view shows that the insert 240 has a varying radius of curvature from the upper end to the lower end in order to provide the narrowing of the flow passage and therefore increase airspeed during use. In some embodiments, the larger upper end may be for example, about two inches in inner diameter and the necked area between insert walls may be about one and one-half (inch diameter) where the wall thickness increases to about one-quarter of an inch. The dimensions may change based on engine size, air flow characteristics and other considerations.

The insert 240 may have an axial length which results in the bottom edge of the inserts abutting or being closely positioned relative to an upper edge of the ring or sleeve 152 (FIG. 8).

Figure 16:
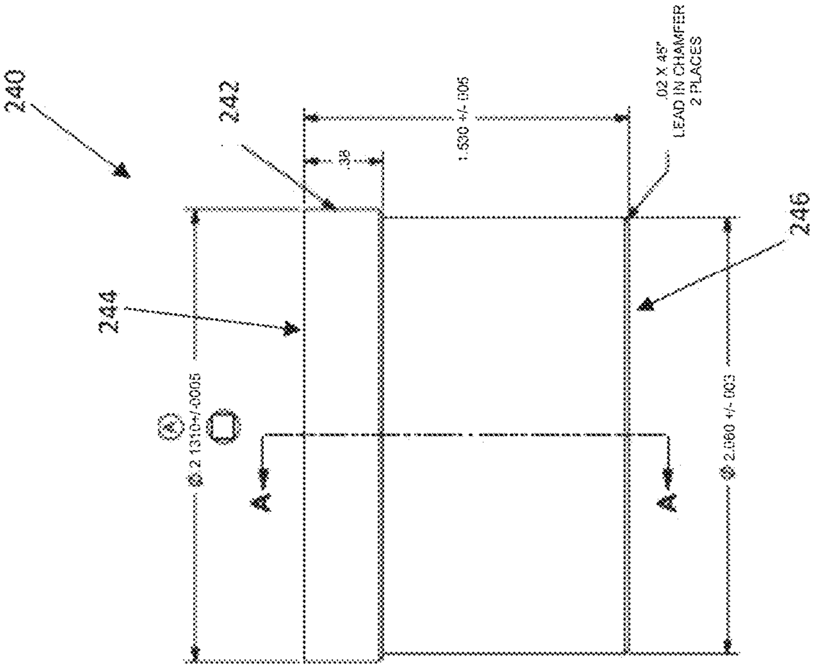
FIG. 16 is a side elevational view of the insert of the throttle body assembly of FIG. 14; and, FIG. 17 is a side section view of the insert which shows the curvature and varying thickness of the insert wall.

With additional reference now to FIG. 16, a side elevation view of the insert 240 is provided. The insert 240 is shown with an upper collar 242 which is positioned in the notched area of the bore 240B. The insert 240 is press fit into position and interference is provided between the upper collar 242 and the bore 240. The notched area of the bore 240B is sized so that the collar 242 cannot pass beyond the notched area.

The insert may be formed of various materials and in some embodiments may be formed of steel, aluminum or an alloy thereof. It may be desirable that the material be the same as the material defining the bore 240B.

Figure 17:
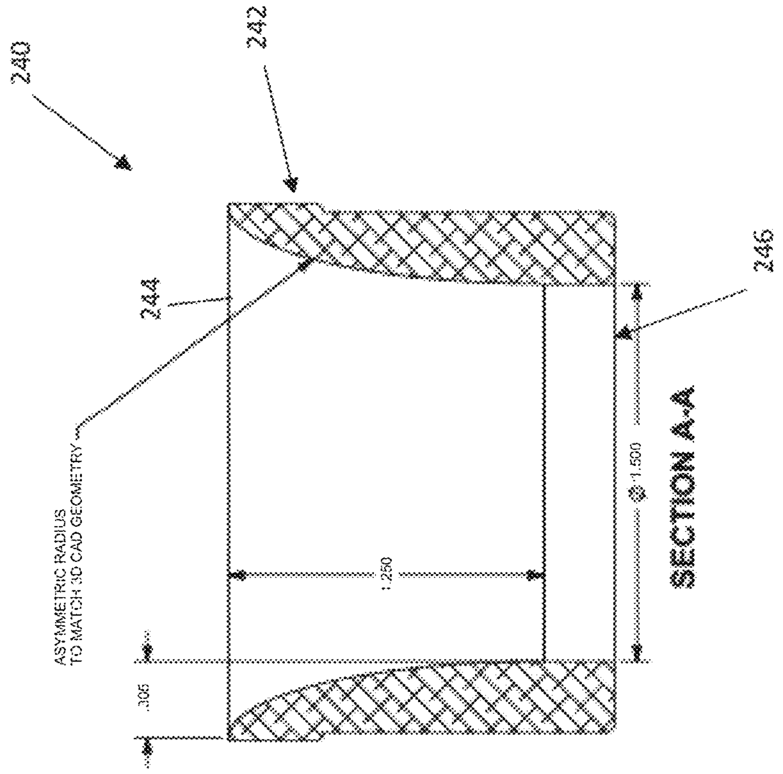

The insert 240 has an upper end 244 and a lower end 246. Between the upper and lower ends, 244, 246, the insert 240 is hollow with varying wall thickness. As shown in FIGS. 15 and 17, the wall is thinner at the upper end and thicker at the lower end. The radius of the curvature of the wall is varying but in some embodiments may be a constant radius.

When the assembly 110 is purchased, the insert 240 may be already positioned in the bores 240B or the end user may install the insert 240, or have an installer do so. This provides some modularity wherein the part may be provided with the purchase while allowing for subsequent installation and use with various types of vehicle engines.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

The foregoing description of methods and embodiments has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

The invention claimed is:

1. An electronic fuel injection body, comprising:

a throttle body having an upper inlet and a lower outlet, said throttle body configured to mount to an internal combustion engine;

a first bore of a first size extending between said inlet and said outlet and a second bore of a second size extending between said inlet and said outlet, said first size and said second size being different sizes, wherein one of said first bore or said second bore is a primary bore and the other of said first bore or said second bore being a secondary bore;

at least one first fuel injector disposed at least partially within said throttle body and adjacent to said first bore;

at least one second fuel injector disposed at least partially within said throttle body and adjacent to said second bore;

each of said first bore and said second bore having a respective fuel distribution ring which receives fuel from one of said first or second fuel injectors, each said fuel distribution ring having a plurality of fuel apertures which provide fuel into said first bore or said second bore for mixing with an airflow;

each of said fuel injectors extending into said throttle body horizontally;

a throttle valve disposed within each of said first and second bores;

a first throttle lever extending through of said first bore and a second throttle lever extending through said second bore, each of said throttle levers having one of said throttle valve, each of said throttle lever rotating to control a position of each respective said throttle valve, and further wherein said first throttle lever and said second throttle lever open said respective throttle valves at different rates;

a first fuel component cover disposed on said throttle body and having at least one fuel passageway therein which is in fluid communication with an exposed portion of said at least one first fuel injector;

a second fuel component cover disposed on said throttle body and having at least one second fuel passageway therein which is in fluid communication with an exposed portion of said at least one second fuel injector.

2. The electronic fuel injection body of claim 1, said first fuel component cover being an inlet cover corresponding to said first bore of a smaller size.

3. The electronic fuel injection body of claim 2, said second fuel component cover being an outlet cover corresponding to said second bore of a larger size.

4. The electronic fuel injection body of claim 1, further comprising a sleeve in each of said first bore and said second bore.

5. The electronic fuel injection body of claim 1, said fuel injectors being located off-center relative to a corresponding said bore.

6. The electronic fuel injection body of claim 1, wherein said fuel injectors extend in a direction that is substantially perpendicular to said first and second throttle levers.

7. The electronic fuel injection body of claim 1, said first bore being two bores and said second bore being two bores.

8. The electronic fuel injection body of claim 1 further comprising a fuel crossover tube extending between said first fuel component cover and said second fuel component cover.

9. An electronic fuel injection body, comprising:

a throttle body having an upper end generally defining an inlet and a lower end generally defining an outlet, said throttle body configured to mount to an internal combustion engine;

a first bore of a first size and a second bore of a second size wherein said first size and said second size differ and wherein one of said first bore and said second bore is a primary bore, each of said first bore and said second bore extending between said inlet and said outlet;

a first fuel component cover associated with said first bore, said first fuel component cover comprising a fuel passageway therein in fluid communication with a first fuel injector;

a second fuel component cover associated with said second bore, said second fuel component cover comprising a second fuel passageway therein in fluid communication with a second fuel injector;

said first fuel injector and said second fuel injector being oriented horizontally and disposed off-center from each respective said bores;

each of said bores comprising a distribution ring which receives fuel from said respective said fuel injector, each said distribution ring having a plurality of apertures to deliver fuel into a respective of said bores to mix with airflow passing therein; and, an electronic control unit on one side of said throttle body and a throttle lever assembly on an opposite side;

said throttle lever assembly rotating one throttle valve of said first bore at a different rate than a second throttle valve of said second bore.

10. The electronic fuel injection body of claim 9, wherein throttle levers of said throttle lever assembly extend in a direction that is perpendicular to the orientation of said first and second fuel injectors.

11. The electronic fuel injection body of claim 9, further comprising a fuel crossover tube extending between said first fuel component cover and said second fuel component cover.

12. The electronic fuel injection body of claim 11, said fuel crossover tube captured between said first and second component covers.

13. The electronic fuel injection body of claim 9, said first bore being two bores and said second bore being two bores.

14. The electronic fuel injection body of claim 9, wherein said first fuel component cover is an input and said second fuel component cover is an output.

15. The electronic fuel injection body of claim 9, further comprising a sleeve disposed in each of said bores.

16. An electronic fuel injection body, comprising:

a throttle body having an upper end generally defining an inlet and a lower end generally defining an outlet, said throttle body configured to mount to an internal combustion engine;

a first and second bore of a first size and a third and fourth bore of a second size wherein said first size differs from said second size, each of said first and second bores extending between said inlet and said outlet;

a first fuel component cover associated with said first bore, said first fuel component cover comprising a fuel passageway therein in fluid communication with a first fuel injector and a second fuel injector, respectively;

a second fuel component cover associated with said second bore, said second fuel component cover comprising a second fuel passageway therein in fluid communication with a third fuel injector and a fourth fuel injector, respectively;

said fuel injectors each being oriented horizontally relative to a respective bore of said bores;

each of said bores comprising a distribution ring which receives fuel from respective said fuel injectors, said distribution ring having a plurality of apertures to deliver fuel into said bores to mix with airflow passing therein;

an external fuel crossover tube disposed above a throttle lever assembly, said external fuel crossover tube captured between said first and second fuel component covers;

said throttle lever assembly having a first throttle lever and a second throttle lever that extend in a direction which is perpendicular to a horizontal orientation of said fuel injectors, said first throttle lever rotating a rate that differs from said second throttle lever.

17. The electronic fuel injection body of claim 16, further wherein said first size and said second size differ in diameter.

* * * * *